US008897520B2

(12) United States Patent
Kanda et al.

(10) Patent No.: US 8,897,520 B2
(45) Date of Patent: Nov. 25, 2014

(54) IMAGE PROCESSING APPARATUS, IMAGE PROCESSING METHOD, AND COMPUTER-READABLE RECORDING MEDIUM

(75) Inventors: Yamato Kanda, Hino (JP); Makoto Kitamura, Hachioji (JP); Takehiro Matsuda, Hachioji (JP); Takashi Kono, Tachikawa (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 325 days.

(21) Appl. No.: 13/210,802

(22) Filed: Aug. 16, 2011

(65) Prior Publication Data
US 2012/0051640 A1    Mar. 1, 2012

(30) Foreign Application Priority Data

Aug. 24, 2010 (JP) ................................ 2010-187679

(51) Int. Cl.
*G06K 9/00* (2006.01)
*G06T 7/00* (2006.01)

(52) U.S. Cl.
CPC ..... *G06T 7/0012* (2013.01); *G06T 2207/10152* (2013.01); *G06T 2207/10024* (2013.01); *G06T 2207/30028* (2013.01); *G06T 2207/10068* (2013.01)
USPC .......................................... 382/128; 382/181

(58) Field of Classification Search
CPC ........ G06K 9/40; G06K 9/6267; G06T 5/001; G06T 5/002; G06T 5/20; G06T 2207/20148
USPC .................. 382/128–133, 275, 181
See application file for complete search history.

(56) References Cited

U.S. PATENT DOCUMENTS

2004/0258285 A1* 12/2004 Hansen et al. ................ 382/128
2007/0009175 A1* 1/2007 Lim et al. ...................... 382/275

(Continued)

FOREIGN PATENT DOCUMENTS

EP    2 085 019 A1    8/2009
JP    4-193254 A    7/1992

(Continued)

OTHER PUBLICATIONS

European Search Report dated Dec. 8, 2011 from corresponding European Patent Application No. EP 11 00 6727.9.

(Continued)

*Primary Examiner* — Amir Alavi
*Assistant Examiner* — Kenny Cese
(74) *Attorney, Agent, or Firm* — Scully, Scott, Murphy & Presser, P.C.

(57) ABSTRACT

An image processing apparatus includes an approximate value calculating unit that calculates an approximate value that becomes consecutive inside an examination area for a pixel value of each pixel of the examination area based on the pixel value inside an image, a validity evaluating unit that evaluates whether the approximate value is valid on the pixel value, an area dividing unit that divides the examination area with the approximate value that is evaluated as being invalid, an examination area re-setting unit that sets each divided area obtained by the area dividing unit as a new examination area and controls a repetition of processing, and an abnormal portion detecting unit that detects an abnormal portion based on the pixel value inside the image and the approximate value that has been evaluated as being valid by the validity evaluating unit.

22 Claims, 19 Drawing Sheets

(56) References Cited

U.S. PATENT DOCUMENTS

| | | |
|---|---|---|
| 2008/0118133 A1 | 5/2008 | Sirohey et al. |
| 2009/0202124 A1* | 8/2009 | Matsuda et al. ............. 382/128 |

FOREIGN PATENT DOCUMENTS

| | | |
|---|---|---|
| JP | 2000-155840 A | 6/2000 |
| JP | 2002-257534 A | 9/2002 |
| JP | 2005-192880 | 7/2005 |
| JP | 2007-75366 A | 3/2007 |
| JP | 2008-51653 A | 3/2008 |
| JP | 2008-307229 A | 12/2008 |
| JP | 2009-291415 A | 12/2009 |
| JP | 2009-297450 A | 12/2009 |
| JP | 2010-113616 A | 5/2010 |
| WO | WO 03/030074 A1 | 4/2003 |

OTHER PUBLICATIONS

Notice of Rejection dated Feb. 25, 2014 from related Japanese Application No. 2010-187679, together with an English language translation.

* cited by examiner

IMAGE PROCESSING APPARATUS, IMAGE PROCESSING METHOD, AND COMPUTER-READABLE RECORDING MEDIUM

CROSS-REFERENCE TO RELATED APPLICATIONS

This application is based upon and claims the benefit of priority from Japanese Patent Application No. 2010-187679, filed on Aug. 24, 2010, the entire contents of which are incorporated herein by reference.

BACKGROUND OF THE INVENTION

1. Field of the Invention

The present invention relates to an image processing apparatus, an image processing method, and a computer-readable recording medium for detecting an abnormal portion from an image.

2. Description of the Related Art

Conventionally, as one of techniques for reducing a doctor's burden on observation of an image of the inside of a lumen of the body that has been captured by an endoscope or a capsule endoscope, there is a technique that detects an abnormal portion such as a bleeding site from an image. For example, in a technique disclosed in Japanese Laid-open Patent Publication No. 2005-192880, first, pixels inside an image or rectangular areas obtained by dividing an image are mapped in the feature space based on color information thereof (chromaticity=R/(R+G+B) and G/(R+G+B), color ratio=R/G, or the like). Then, after clustering is performed in the feature space, a normal mucous membrane cluster and an abnormal portion cluster are specified based on information such as the size or centroid coordinates of each cluster, and a pixel or a rectangular area that belongs to the abnormal portion cluster is detected as the abnormal portion.

SUMMARY OF THE INVENTION

An image processing apparatus according to an aspect of the present invention includes an approximate value calculating unit that calculates approximate values for respective pixel values of pixels of an examination area, the approximate values being consecutive within the examination area, based on the pixel values of the pixels of the examination area in an image; a validity evaluating unit that evaluates whether the approximate value is valid as the pixel value of the examination area; an area dividing unit that divides an examination area with the approximate values determined to be invalid by the validity evaluating unit; an examination area re-setting unit that sets each area divided by the area dividing unit as a new examination area and controls a repetition of processing; and an abnormal portion detecting unit that detects an abnormal portion based on the pixel values of the pixels in the image and the approximate values determined to be valid by the validity evaluating unit.

An image processing method according to another aspect of the present invention includes calculating an approximate value that becomes consecutive inside an examination area for a pixel value of each pixel of the examination area based on the pixel value of the pixel of the examination area inside an image; evaluating whether the approximate value is valid on the pixel value of the examination area; dividing the examination area with the approximate value evaluated as being invalid; setting each divided area as a new examination area and controlling a repetition of processing; and detecting an abnormal portion based on the pixel value of the pixel inside the image and the approximate value that has been evaluated as being valid on the pixel value of the examination area.

A non-transitory computer-readable recording medium according to still another aspect of the present invention has an executable program stored thereon, wherein the program instructs a processor to perform: calculating an approximate value that becomes consecutive inside an examination area for a pixel value of each pixel of the examination area based on the pixel value of the pixel of the examination area inside an image; evaluating whether or not the approximate value is valid on the pixel value of the examination area; dividing the examination area with the approximate value that has been evaluated as being invalid; setting each divided area as a new examination area and controlling a repetition of processing; and detecting an abnormal portion based on the pixel value of the pixel inside the image and the approximate value that has been evaluated as being valid for the pixel value of the examination area.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
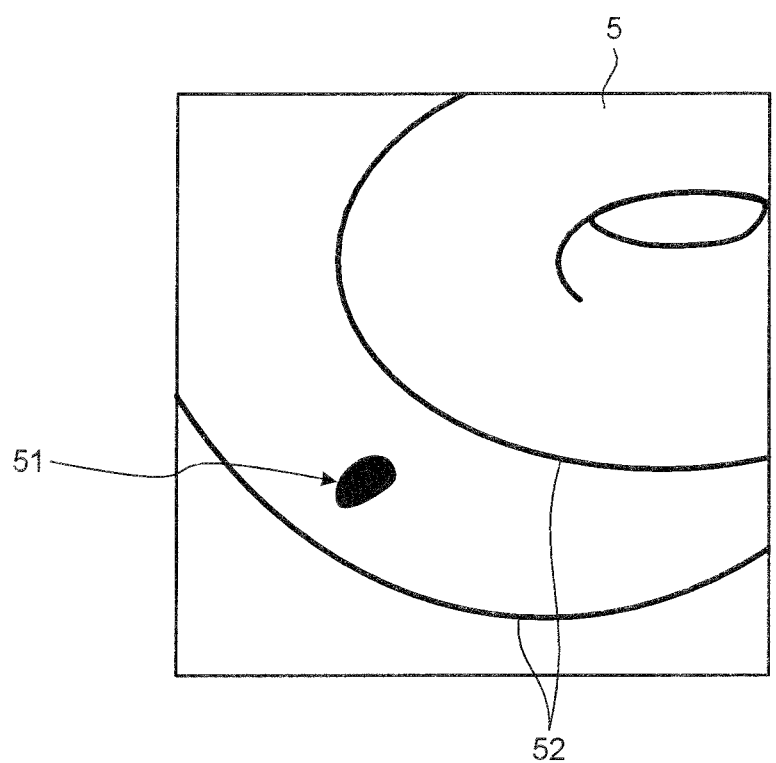
FIG. 1 is a schematic diagram illustrating an example of an intraluminal image captured by an endoscope.

Hereinafter, preferred embodiments of the present invention will be described with reference to the accompanying drawings. The present embodiment will be described in connection with an image processing apparatus that processes an intraluminal image (an image of the inside of a digestive tract) captured by an endoscope. The present invention is not limited to the following embodiments. Like reference numerals in the drawings denote like elements.

The present embodiment will be described in connection with an image processing apparatus that processes an intraluminal image (an image of the inside of a digestive tract) captured by an endoscope. The endoscope refers to a medical device for observing the inside of the lumen such as the digestive tract and to a system device that includes: an insertion unit that is inserted into the inside of the lumen, and an illumination system, an optical system, an imaging system, and the like for imaging are built in a leading end thereof; a casing unit that is connected with the insertion unit and has a light source, an image processing apparatus, and the like built therein; a display unit that displays an captured intraluminal image; and the like.

FIG. 1 is a schematic diagram illustrating an example of an intraluminal image captured by an endoscope. In the intraluminal image, a mucous membrane 5 of a digestive track inner wall is basically shown, and an abnormal portion 51 such as a bleeding site is sometimes shown. In the intraluminal image, the abnormal portion 51 typically appears as an area having a pixel value different from its neighborhood. Further, in the intraluminal image, a groove that is generated, for example, by gathering or undulations of the mucous membrane 5, a contour of the mucous membrane 5, or the like appears as an edge 52. The image processing apparatus of the present embodiment detects the abnormal portion such as the bleeding site by processing the intraluminal image captured by the endoscope.

First Embodiment

Figure 2:
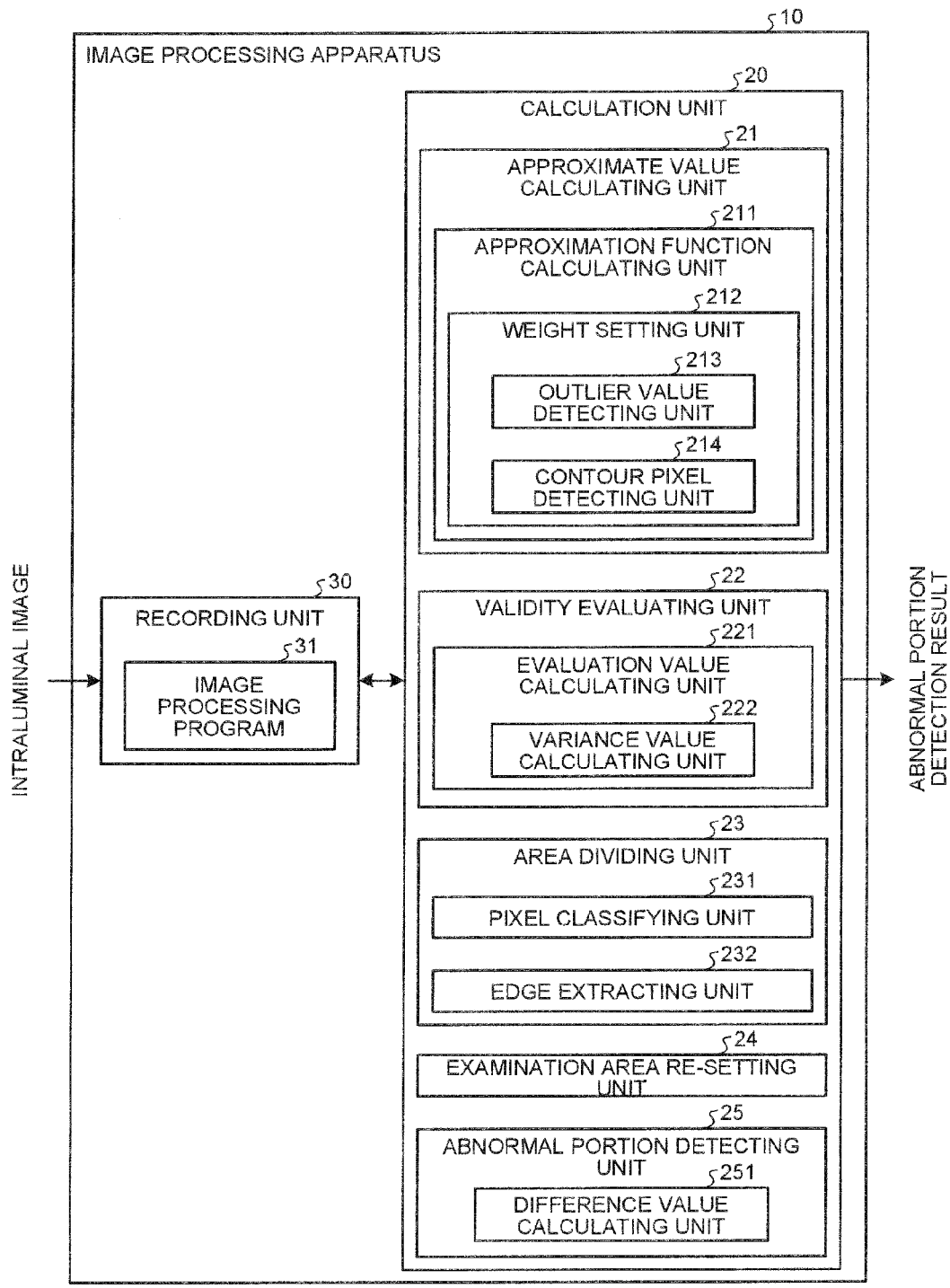
FIG. 2 is a schematic block diagram for explaining a main configuration of an image processing apparatus according to a first embodiment.

First, a configuration of an image processing apparatus 10 according to a first embodiment will be described. FIG. 2 is a schematic block diagram for explaining a main configuration of the image processing apparatus 10 according to the first embodiment. As illustrated in FIG. 2, the image processing apparatus 10 according to the first embodiment includes a calculation unit 20 and a recording unit 30. For example, the image processing apparatus 10 is integrated into the endoscope. The image processing apparatus 10 receives the intraluminal image captured by the endoscope and outputs an abnormal portion detection result obtained by processing the intraluminal image.

The calculation unit 20 is implemented by hardware such as a central processing unit (CPU) and performs a variety of calculation processes for detecting the abnormal portion from the intraluminal image. The calculation unit 20 includes an approximate value calculating unit 21, a validity evaluating unit 22, an area dividing unit 23, an examination area re-setting unit 24, and an abnormal portion detecting unit 25.

The approximate value calculating unit 21 calculates an approximate value that becomes consecutive inside an examination area on a pixel value of each pixel of the examination area based on the pixel value of the pixel of the examination area. The examination area refers to the entire area of the intraluminal image or a partial area of the intraluminal image. In the first embodiment, the examination area is appropriately changed and set in the process of processing. Specifically, in the first embodiment, the entire area of the intraluminal image is set as the examination area at the initial stage, and an area obtained by dividing the examination area is appropriately set as a new examination area. The approximate value calculating unit 21 includes an approximation function calculating unit 211. The approximation function calculating unit 211 calculates an approximation function of an input value to an output value in which coordinates of the pixel of the examination area are the input value and the pixel value at the coordinates used as the input value is the output value, and uses the calculated approximation function as an approximation function on the examination area. The approximation function calculating unit 211 includes a weight setting unit 212 that sets a weight on each pixel of the examination area. The weight setting unit 212 includes an outlier detecting unit 213 and a contour pixel detecting unit 214. The outlier detecting unit 213 detects a pixel whose pixel value is an outlier as an outlier pixel from among the pixels of the examination area. The contour pixel detecting unit 214 detects a pixel (a contour pixel) that configures a contour of the examination area.

The validity evaluating unit 22 evaluates whether or not the approximate value is valid on the pixel value of the examination area. The validity evaluating unit 22 includes an evaluation value calculating unit 221 that calculates an evaluation value representing an approximation degree of the approximate value of the pixel value of the pixel of the examination area. The evaluation value calculating unit 221 includes a variance value calculating unit 222 that calculates a variance value, inside the examination area, of a difference between the pixel value and the approximate value of each pixel of the examination area.

The area dividing unit 23 divides the examination area on which the validity evaluating unit 22 has evaluated the approximate value as invalid. The area dividing unit 23 includes a pixel classifying unit 231 and an edge extracting unit 232. The pixel classifying unit 231 compares the pixel value of each pixel of the examination area with the approximate value and classifies the pixels of the examination area into a pixel having a pixel value higher than the approximate value and a pixel having a pixel value lower than the approximate value. The edge extracting unit 232 extracts an edge inside the examination area.

The examination area re-setting unit 24 sets each area divided by the area dividing unit 23 as a new examination area and controls a repetition of processing.

The abnormal portion detecting unit 25 detects the abnormal portion based on the pixel value of each pixel of the intraluminal image and the approximate value of each pixel that has been evaluated as valid by the validity evaluating unit 22. The abnormal portion detecting unit 25 includes a difference value calculating unit 251 that calculates a difference value between the pixel value and the approximate value of each pixel of the intraluminal image.

The recording unit 30 is implemented by various integrated circuit (IC) memories such as a rewritable flash memory, a read only memory (ROM), and a random access memory (RAM), a hard disk that is built in or connected to a data communication terminal, or various recording media such as a compact disc-read only memory (CD-ROM), and a reading device thereof. In the recording unit 30, there are recorded a program for realizing various functions included in the image processing apparatus 10 by operating the image processing apparatus 10, data used during execution of the program, and the like. For example, image data of the intraluminal image that is captured by the endoscope and input to the image processing apparatus 10 is recorded in the recording unit 30. Further, in the recording unit 30, an image processing program 31 for implementing processes of the first embodiment and detecting the abnormal portion from the intraluminal image is recorded.

Figure 3:
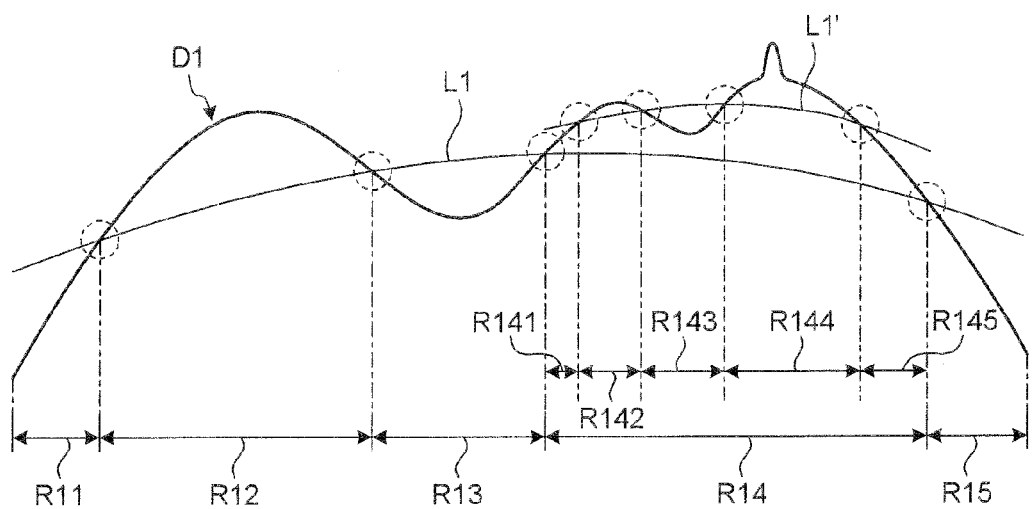
FIG. 3 is an explanatory diagram for explaining the principle of detecting an abnormal portion.

The principle of detecting the abnormal portion according to the first embodiment will be described with reference to FIG. 3. FIG. 3 is an explanatory diagram for explaining the principle of detecting the abnormal portion. FIG. 3 schematically illustrates the pixel value distribution in which the pixel value of the intraluminal image is represented by an elevation. In further detail, FIG. 3 illustrates a pixel value distribution D1 in a cross section of the intraluminal image in a predetermined direction.

In an approximate value calculation process according to the first embodiment, the entire area of the intraluminal image is first set as the examination area, and the approximate value that becomes consecutive inside the examination area is calculated on the pixel value of each pixel of the examination area. Specifically, first by calculating an approximate curved surface on the examination area based on the pixel value of each pixel, the approximate value of the pixel value of each pixel is calculated. For example, as illustrated in FIG. 3, an approximate curved surface L1 obtained by approximating the pixel value of each pixel is calculated, and a value of each pixel (coordinates) on the approximate curved surface L1 is obtained as an approximate value of a corresponding pixel. Next, it is evaluated whether or not the approximate value in the examination area is valid based on the pixel value of each pixel (coordinates). As will be described later in detail, if an approximate value appropriate to an overall change of the pixel value in the examination area is obtained, the approximate value is evaluated as valid.

When it is judged that the approximate value is invalid, the new examination area is set by dividing the examination area. For example, the pixels of the examination area are classified into a pixel having a pixel value higher than the approximate value and a pixel having a pixel value lower than the approximate value, and the examination area is divided into areas that respectively correspond to ranges R11 to R15 illustrated in FIG. 3. Each divided area is set as the new examination area, and a process of calculating the approximate value of each pixel is repeated until the approximate value in the examination area is evaluated as valid. For example, in FIG. 3, the examination area corresponding to the range R14 is further divided into ranges R141 to R145 by a height comparison between an approximate value obtained based on an approximate curved surface L1' and the pixel value. Each range is set as the examination area, the approximate curved surface is individually calculated, and the approximate value is calculated.

Figure 4:
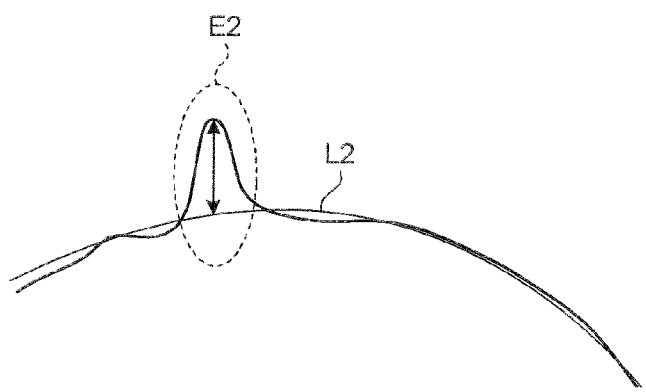
FIG. 4 is another explanatory diagram for explaining the principle of detecting an abnormal portion.

After the approximate values of all of the examination areas is evaluated as valid, the pixel of the abnormal portion is detected based on a difference value between the pixel value and the approximate value of each pixel. FIG. 4 is an enlarged diagram illustrating the pixel value distribution of the range R144 of FIG. 3 and illustrates an approximate curved surface L2 of an approximate value evaluated as valid on the range R144. As illustrated in FIG. 4, by repetitively dividing the examination area, an approximate value appropriate to an overall change of the pixel value can be obtained for each examination area, and an approximate value can be obtained as a reference value of the pixel value of each pixel (coordinates) that is based on neighboring pixel values in units of examination areas. When the approximate value is obtained, a portion E2 having a large difference encircled by a dotted line is detected as the abnormal portion.

In the first embodiment, the abnormal portion having the pixel value different from the neighboring pixels like the portion E2 indicated by the dotted line in FIG. 4 is detected by obtaining the approximate value through the above described process. If a portion having the pixel value different from the neighboring pixels like the portion E2 is small compared to the entire examination area, even though the approximate curved surface is calculated based on the pixel value of the entire examination area, the valid approximate value can be obtained, and the abnormal portion can be detected. However, if the approximate curved surface is calculated by excluding the pixel value of the portion like the portion E2, the abnormal portion can be detected with a higher degree of accuracy. Thus, in the first embodiment, the approximate curved surface is calculated by excluding a pixel value of a pixel (an outlier pixel) whose pixel value greatly goes astray like the portion E2. As will be described later in detail, in an actual process, an approximate curved surface is first calculated, a pixel whose pixel value greatly strays from an approximate value is set as the outlier pixel, and then an approximate curved surface calculated again after excluding the outlier pixel is used as an approximate curved surface on the examination area.

Meanwhile, in the present method, since the approximate value is obtained by calculating the approximate curved surface for each divided examination area, for example, the approximate value may not consecutively change in the contour (the boundary between the examination areas) portion of the examination area encircled by the dotted line in FIG. 3. Thus, in the first embodiment, in order to make the approximate value be consecutive between the examination areas, the approximate curved surface is calculated by increasing the data number of the contour pixel of the examination area.

Figure 5:
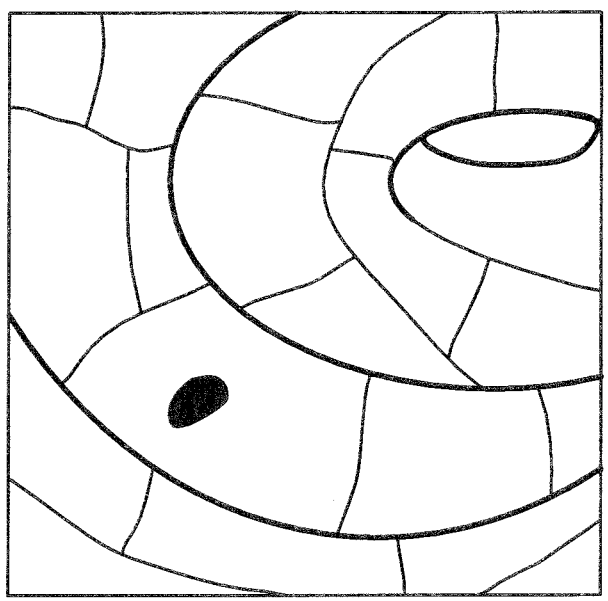
FIG. 5 is a schematic diagram illustrating an examination area divided by processing the intraluminal image of FIG. 1.

FIG. 5 is a schematic diagram illustrating the examination areas divided finally as a result of processing the intraluminal image of FIG. 1. As described above, in the first embodiment, inside the examination area, obtained is the approximate value appropriate to an overall change of the pixel value of each pixel except the outlier pixel, and in the contour portion of the examination area, the approximate value is obtained so that the approximate value can be consecutive between adjacent examination areas.

Figure 6:
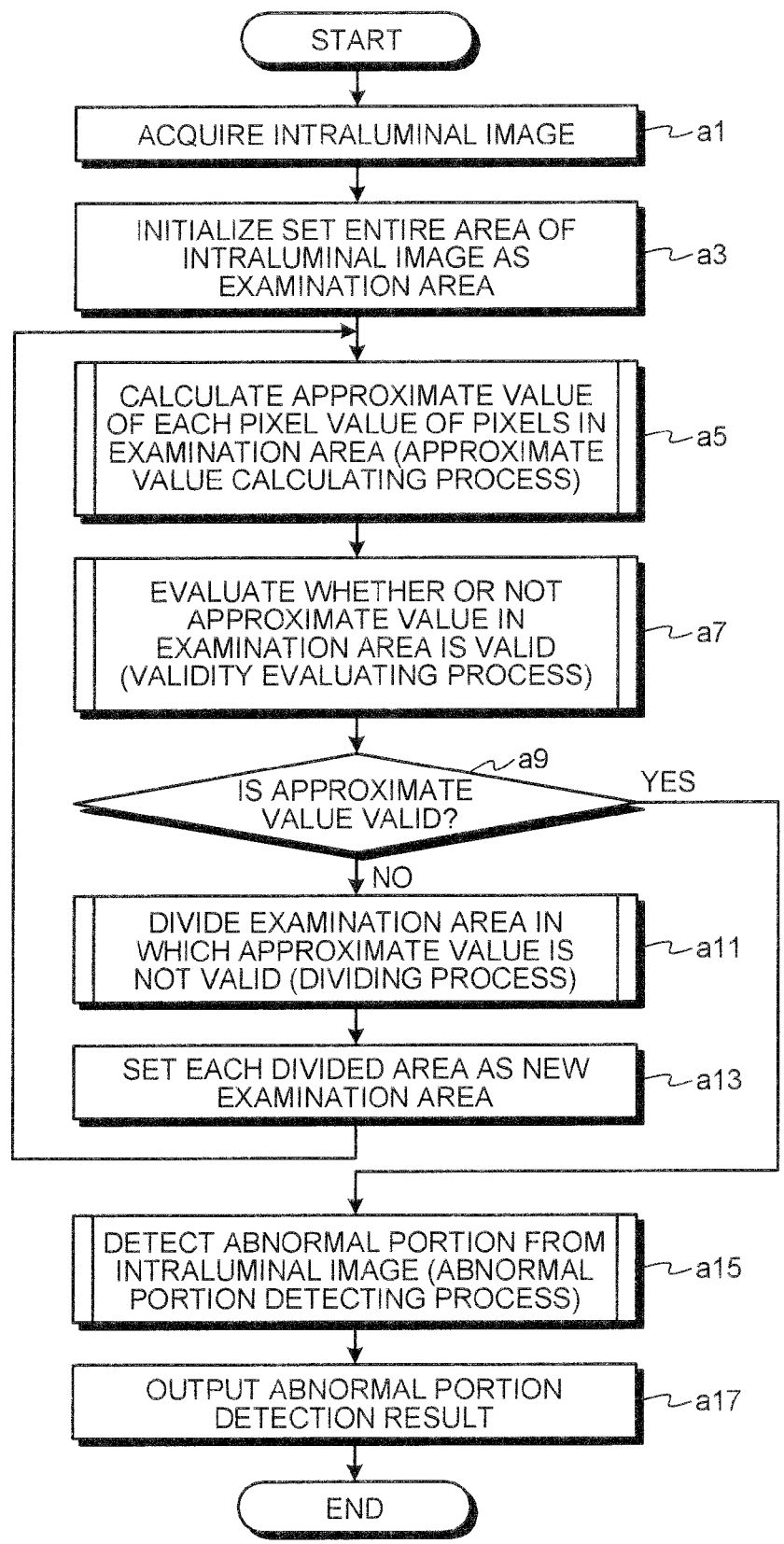
FIG. 6 is an overall flowchart illustrating a processing sequence performed by the image processing apparatus according to the first embodiment.

Next, a detailed processing sequence performed by the image processing apparatus 10 according to the first embodiment will be described. FIG. 6 is an overall flowchart illustrating a processing sequence performed by the image processing apparatus 10 according to the first embodiment. The process described below is implemented by executing the image processing program 31 recorded in the recording unit 30 through the calculation unit 20.

As illustrated in FIG. 6, the calculation unit 20 first acquires the intraluminal image to be processed (step a1). By this process, for example, the intraluminal image that is captured by the endoscope and then recorded in the recording unit 30 is read and acquired. The calculating unit 20 initializes the entire area of the intraluminal image to be processed acquired in step a1 as the examination area (step a3).

Figure 7:
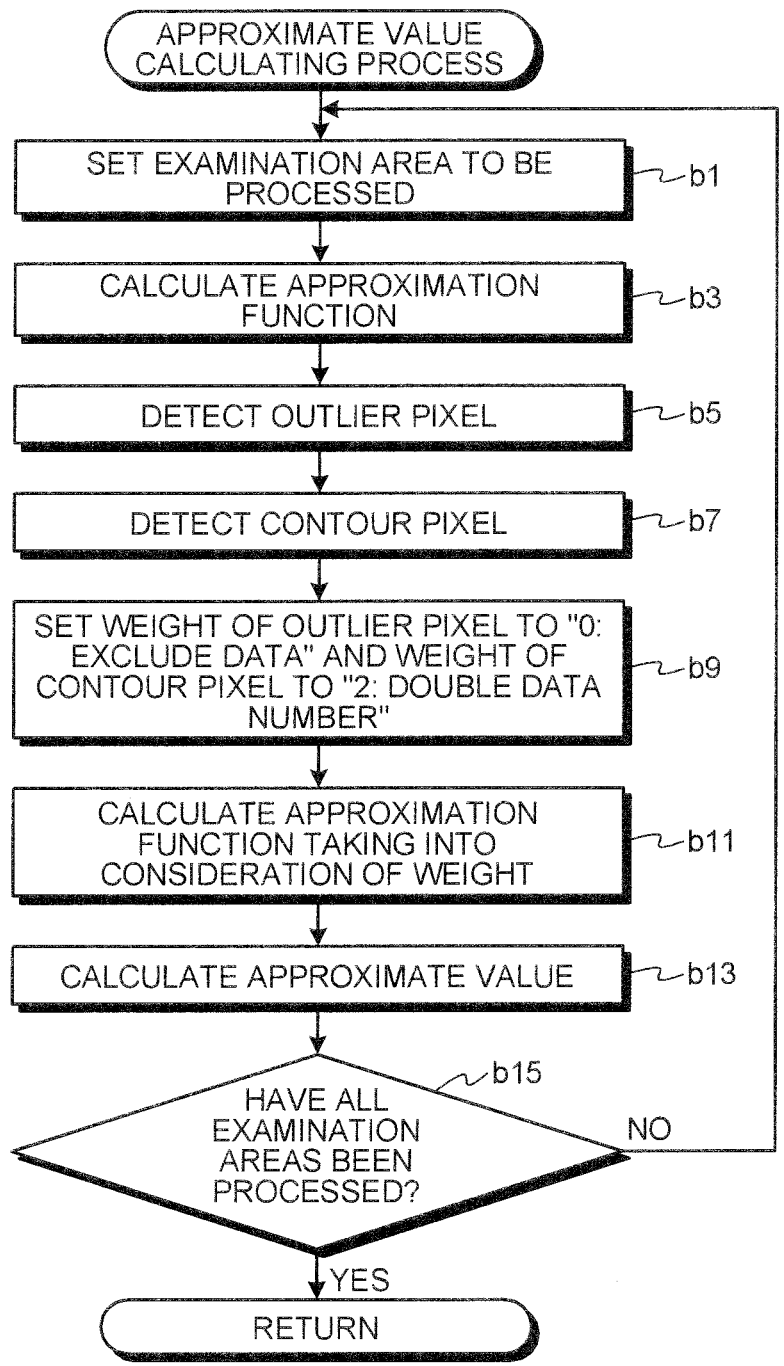
FIG. 7 is a flowchart illustrating a detailed processing sequence of an approximate value calculating process according to the first embodiment.

Next, the approximate value calculating unit 21 executes an approximate value calculating process and calculates the approximate value of the pixel value of each pixel of the examination area (step a5). FIG. 7 is a flowchart illustrating a detailed processing sequence of the approximate value calculating process according to the first embodiment.

As illustrated in FIG. 7, in the approximate value calculating process according to the first embodiment, the approximate value calculating unit 21 first sets the examination area to be processed (step b1). At the initial stage of the approximate value calculating process, in step a3 of FIG. 6, the entire area of the intraluminal image is set as the examination area, and in step b1 of FIG. 7, the entire area of the intraluminal image is set as being processed. Meanwhile, when the approximate value, on the pixel value of each pixel of the examination area, obtained by executing the approximate value calculating process is evaluated as invalid in subsequent step a7 of FIG. 6 and the examination area is divided in step a11, a plurality of examination areas are present. In this case, in step b1 of FIG. 7, the plurality of examination areas are sequentially set as being processed.

Next, the approximation function calculating unit 211 calculates the approximation function representing the approximate curved surface on the examination area to be processed (step b3). In this example, as the approximation function, a quadratic function represented in the following Equation (1) is used. Here, x and y represent coordinates of a pixel, and z represents a pixel value. The pixel value may be a value of each of R, G and B components or may be an intensity, a color difference, a hue, a saturation, a brightness, or the like which is secondary calculated by well-known transformation based on the R, G, and B components.

$$z = ax^2 + by^2 + cxy + dx + ey + f \quad (1)$$

Coefficients a to f of the function formula of Equation (1) are obtained from the coordinates $(x_i, y_i)$ (i=1 to n, where n is the number of pixels) and the pixel value $z_i$ of the pixel of the examination area according to the following Equation (2) obtained by the least-square method.

$$\begin{bmatrix} a \\ b \\ c \\ d \\ e \\ f \end{bmatrix} = (A^t \times A)^{-1} \times A^t \times \begin{bmatrix} z_1 \\ z_2 \\ \vdots \\ z_n \end{bmatrix} \quad (2)$$

where $$A = \begin{bmatrix} x_1^2 & y_1^2 & x_1 y_1 & x_1 & y_1 & 1 \\ x_2^2 & y_2^2 & x_2 y_2 & x_2 & y_2 & 1 \\ \vdots & \vdots & \vdots & \vdots & \vdots & \vdots \\ x_n^2 & y_n^2 & x_n y_n & x_n & y_n & 1 \end{bmatrix}$$

Next, the outlier detecting unit 213 detects the outlier pixel from among the pixels of the examination area to be processed (step b5). In a detailed processing sequence, an approximate value z' is first calculated, on the pixel value z of each pixel of the examination area, based on the coordinates according to Equation (1). Next, a variance value σ, inside the examination area, of a difference between the approximate value z' and the actual pixel value z is calculated. Thereafter, a pixel whose pixel value z is equal to or more than kσ (k is a predetermined value) away from the approximate value z' is detected as the outlier pixel.

Next, the contour pixel detecting unit 214 detects the contour pixel of the examination area to be processed (step b7). This may be implemented by using known contour tracing (reference: "Digital Image Processing", CG-ARTS Society, P178, *Contour Tracing*).

Next, the weight setting unit 212 sets the weight of the outlier pixel to "0" and the weight of the contour pixel to "2" (step b9). This is performed to exclude data (coordinates and pixel value) of the outlier pixel and double data (coordinates and pixel value) of the contour pixel when calculating the approximation function in subsequent step b11. The outlier pixel is excluded so as to obtain the approximation function in which influence of a pixel having a high possibility of an abnormal portion, a noise, or the like is reduced as described with reference to FIGS. 3 and 4, and the contour pixel is doubled so as to make the approximate value be more consecutive between the examination areas. Further, a pixel that is neither the outlier pixel nor the contour pixel is given the weight of "1".

Next, the approximation function calculating unit 211 calculates the approximation function on the examination area to be processed in view of the weight set in step b9 step b11). Specifically, the coefficients a to f of the function formula of Equation (1) are obtained, according to Equation (2), in view of the coordinates $(x_i, y_i)$ (i=1 to n, where n is the number of pixels when the outlier pixel is excluded and the contour pixel is doubled) and the pixel value $z_i$ of the pixel of the examination area when the outlier pixel is excluded and the contour pixel is doubled.

Next, the approximate value calculating unit 21 calculates the approximate value of the pixel value of each pixel of the examination area to be processed (step b13). In a similar manner to step b5, on the pixel value z of each pixel of the examination area, the approximate value z' is preferably calculated based on the coordinates according to Equation (1).

Thereafter, the approximate value calculating unit 21 determines whether or not all of the examination areas have been processed. When it is determined that all of the examination areas has not been processed (No in step b15), step b1 to step b13 are repeated. Meanwhile, when it is determined that all of the examination areas has been processed (Yes in step b15), the process returns to step a5 of FIG. 6 and then proceeds to step a7.

Figure 8:
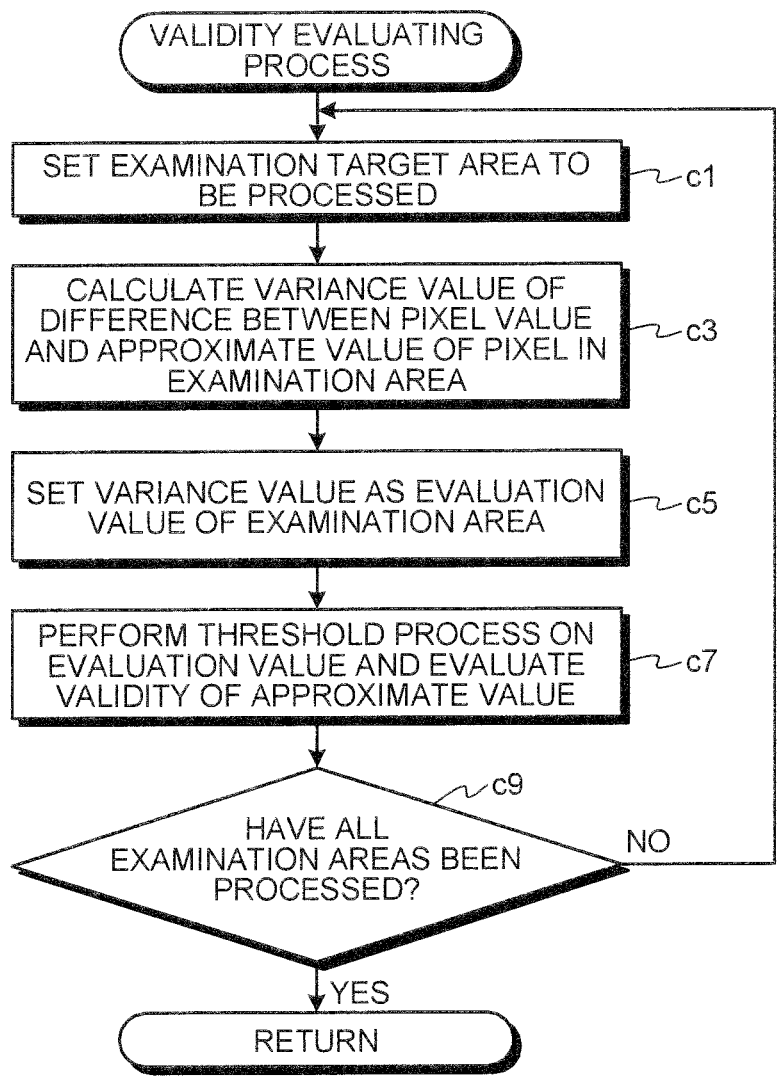
FIG. 8 is a flowchart illustrating a detail processing sequence of a validity evaluating process.

In step a7, the validity evaluating unit 22 executes a validity evaluating process and evaluates whether or not the approximate value in the examination area is valid. FIG. 8 is a flowchart illustrating a detail processing sequence of the validity evaluating process.

As illustrated in FIG. 8, in the validity evaluating process, the validity evaluating unit 22 first sets the examination area to be processed (step c1). Next, in step c3, the variance value calculating unit 222 calculates the variance value σ, inside the examination area, of the difference between the approximate value z' calculated in step b13 of FIG. 7 and the actual pixel value z on each pixel of the examination area to be processed. At this time, the variance value σ is calculated in view of the weight set in step b9 of FIG. 7 on the corresponding examination area. Specifically, the variance value σ in which a difference with the outlier pixel is excluded and a difference with the contour pixel is doubled in data number is calculated by multiplying the difference between the approximate value z' and the actual pixel value z of each pixel of the corresponding examination area by the weight set in step b9. As described above, this is because it is desired to reduce influence of the outlier pixel and to obtain the approximate value that is consecutive between the adjacent examination areas.

Next, the evaluation value calculating unit 221 sets the variance value calculated in step c3 as the evaluation value representing the approximation degree of the approximate value of the pixel value of the pixel of the examination area to be processed (step c5). Then, the validity evaluating unit 22 performs threshold processing on the evaluation value of the examination area to be processed, evaluates that the approximate value of the examination area to be processed is not valid when the evaluation value is larger than a predetermined threshold value set in advance, and evaluates that the approximate value of the examination area to be processed is valid when the evaluation value is equal to or less than the threshold value (step c7).

Thereafter, it is determined whether or not all of the examination areas have been processed. When it is determined that all of the examination areas has not been processed (No in step c9), step c1 to step c7 are repeated. Meanwhile, when it is determined that all of the examination areas has been processed (Yes in step c9), the process returns to step a7 of FIG. 6 and then proceeds to step a9.

Then, in step a9, it is determined whether or not the approximate values of all of the examination areas have been evaluated as valid. When it is determined that the approximate values of all of the examination areas have been evaluated as valid (Yes in step a9), the process shifts to step a15 to be described below. Meanwhile, when it is determined that the approximate values have not been evaluated as valid (No in step a9), the process proceeds to step a11.

Figure 9:
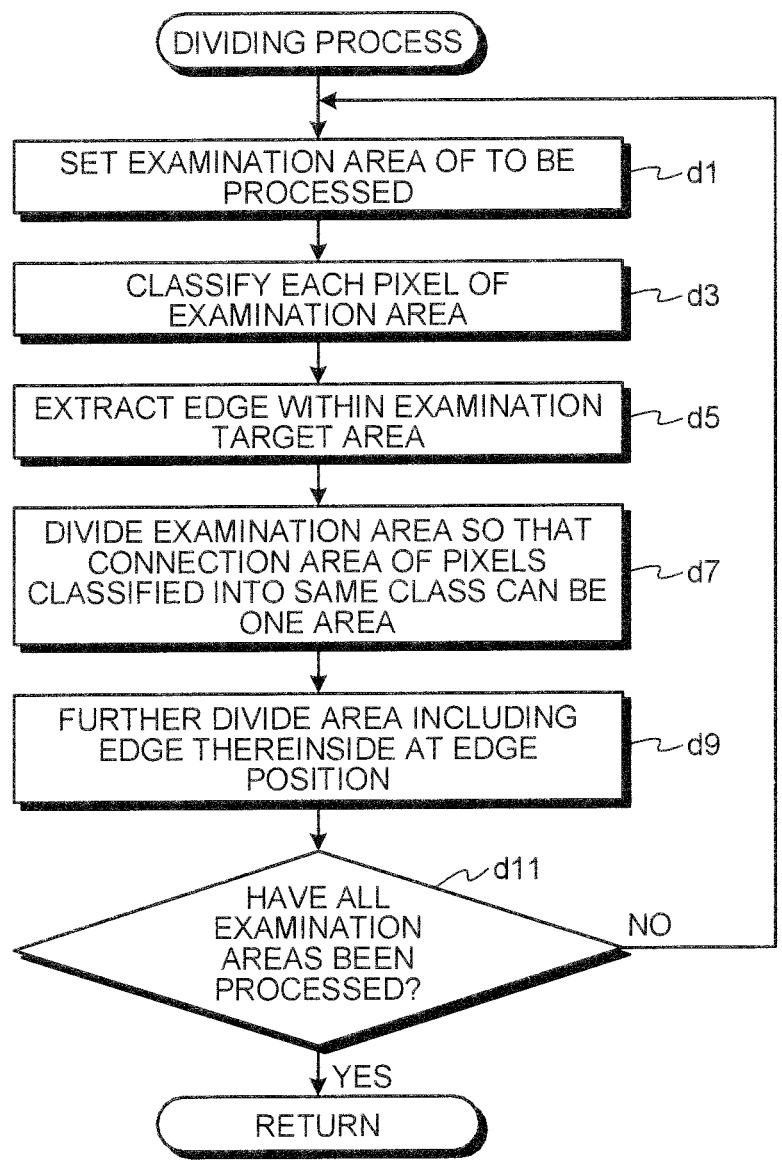
FIG. 9 is a flowchart illustrating a detail processing sequence of a dividing process.

In step a11, the area dividing unit 23 executes a dividing process and divides the examination area in which the approximate value has been evaluated as invalid. FIG. 9 is a flowchart illustrating a detail processing sequence of the dividing process.

As illustrated in FIG. 9, in the dividing process, the area dividing unit 23 first sets the examination area to be processed (step d1). In this process, the examination areas in which the approximate value has been evaluated as invalid in the validity evaluating process of FIG. 8 executed immediately before are sequentially set as being processed.

Next, the pixel classifying unit 231 classifies each pixel of the examination area to be processed into a pixel having a pixel value higher than the approximate value and a pixel having a pixel value lower than the approximate value (step d3).

Next, in step d5, the edge extracting unit 232 extracts an edge inside the examination area to be processed. This may be implemented using a canny algorithm (reference: "Digital image processing", CG-ARTS boundary, P209, *Contour Line Detection*) or the like.

Next, the area dividing unit 23 divides the examination area to be processed so that a connection area of pixels classified into the same class in step d3 can be one area (step d7). Then, the area dividing unit 23 further divides an area including an edge among the divided areas using at an edge position as a dividing boundary (step d9). This may be implemented using a known labeling process (reference: "Digital image processing", CG-ARTS society, P181, *Labeling*). As a result, the examination area is divided so that each of the finally divided areas can be one area.

Figure 10A:
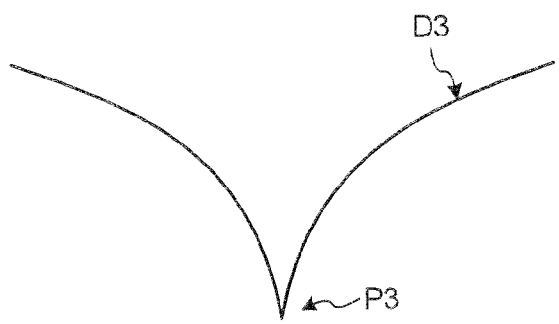
FIG. 10A is an explanatory diagram for explaining the principle of a dividing process.
Figure 10B:
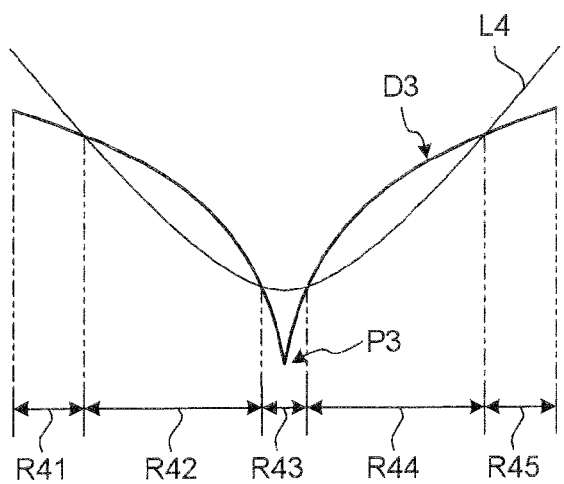
FIG. 10B is another explanatory diagram for explaining the principle of a dividing process.
Figure 10C:
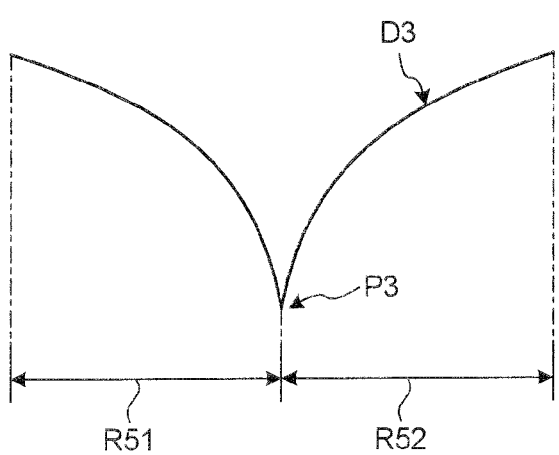
FIG. 10C is another explanatory diagram for explaining the principle of a dividing process.

FIGS. 10A to 10C are explanatory diagrams for explaining the principle of the dividing process and schematically illustrate a pixel value distribution D3 in an area including an edge portion P3 in a similar manner to FIG. 3. As illustrated in FIG. 10A, the pixel value steeply changes in the edge portion P3. Here, if an approximate curved surface is calculated using the area including the edge portion P3 as one examination area, for example, as illustrated in FIG. 10B, an approximate curved surface L4 is obtained. In this case, the examination area is further divided into areas that respectively correspond to ranges R41 to R45 illustrated in FIG. 10B, and the examination area including the edge portion P3 is repeatedly divided. In order to prevent this situation, the area including the edge portion P3 thereinside is further divided at the edge position as illustrated in FIG. 10C, and a subsequent process is performed using two areas corresponding to ranges R51 and R52 as separate examination areas. As a result, as described above, compared to the case of setting the entire area of FIG. 10A as one examination area, a processing load is reduced.

Thereafter, the area dividing unit 23 determines whether or not all of the examination areas in which the approximate value has been evaluated as invalid have been processed. When it is determined that all of the examination areas in which the approximate value has been evaluated as invalid have not been processed (No in step d11), step d1 to step d9 are repeated. Meanwhile, when it is determined that all of the examination areas in which the approximate value has been evaluated as invalid have been processed (Yes in step d11), the process returns to step a11 of FIG. 6 and then proceeds to step a13.

Then, in step a13, the examination area re-setting unit 24 sets each area divided in step a11 as a new examination area. Then, the process returns to step a5 and is repeated.

Figure 11:
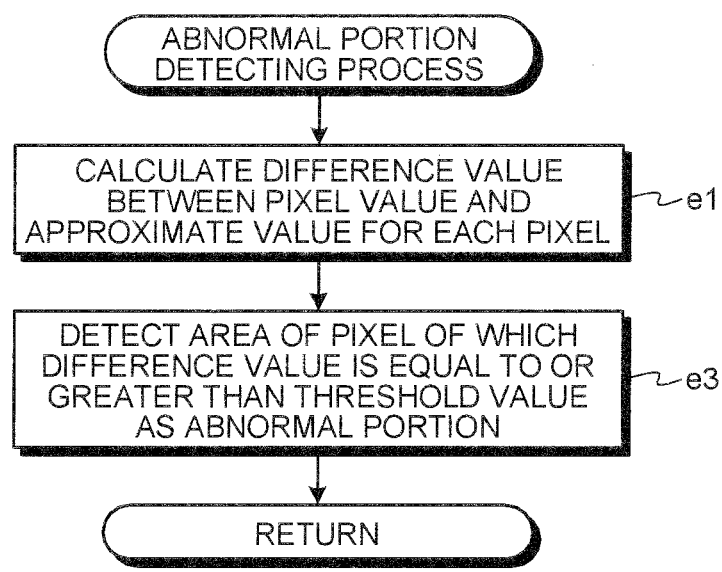
FIG. 11 is a flowchart illustrating a detailed processing sequence of an abnormal portion detecting process.

Meanwhile, when it is determined that the approximate values of all of the examination areas have been evaluated as valid (Yes in step a9), the abnormal portion detecting unit 25 executes an abnormal portion detecting process and detects the abnormal portion from the intraluminal image to be processed (step a15). FIG. 11 is a flowchart illustrating a detailed processing sequence of the abnormal portion detecting process.

As illustrated in FIG. 11, in the abnormal portion detecting process, the difference value calculating unit 251 first calculates the difference value between the pixel value and the approximate value for each of the pixels of the intraluminal image (step e1). The abnormal portion detecting unit 25 performs threshold processing on the difference value and detects an area configured with a pixel in which the difference value is equal to or more than a predetermined threshold value as the abnormal portion (step e3). In further detail, at this time, the abnormal portion detecting unit 25 determines an area having an area size equal to or less than a predetermined threshold value, among areas configured with a pixel in which the difference value is equal to or more than the threshold value, as a noise. Then, the abnormal portion detecting unit 25 detects an area (an area having an area size larger than a predetermined threshold value) other than an area determined as a noise as the abnormal portion. Thereafter, the process returns to step a15 of FIG. 6.

Finally, as illustrated in FIG. 6, the calculation unit 20 outputs the abnormal detection result, and the process by the image processing apparatus 10 is finished (step a17).

As described above, according to the first embodiment, by repeating approximate value calculation while dividing the examination area until the approximate value, which is consecutive to a neighboring pixel within the examination area and appropriate to an overall change of the pixel value in the examination area, is obtained, the abnormal portion can be detected based on the difference value between the actual pixel value and the approximate value evaluated as valid. Thus, the abnormal portion having the pixel value different from the neighboring pixel can be detected with a high degree of accuracy.

In addition, when the intraluminal image is an image including a plurality of wavelength components, the process described in the first embodiment may be performed for each wavelength component. For example, when the intraluminal image as being processed is a color image having a pixel level (a pixel value) on each of red (R), green (G), and blue (B) wavelength components, approximate value calculation is preferably repeated while dividing the examination area for each of the R, G, and B wavelength components. In this case, in the abnormal portion detecting process, preferably, the difference value between the actual pixel value and the approximate value evaluated as valid is calculated for each wavelength component, threshold processing is performed, for example, on an average value or a maximum value of the difference value of each wavelength component, and an area configured with a pixel in which the average value or the maximum value of the difference value is equal to or more than a predetermined threshold value is detected as the abnormal portion.

Second Embodiment

First, a configuration of an image processing apparatus according to a second embodiment will be described. In the second embodiment, as the intraluminal image to be processed, a color image having a pixel value on each of the R, G, and B wavelength components of each pixel is assumed. Here, since the R component is a wavelength component away from a blood absorbing band and a long wavelength component, the R component is difficult to be influenced by light absorption or light scattering of a living body on illumination light and shows a pixel value best corresponding to a structure of a body tissue that is an imaging target. Meanwhile, the G and B components are easily influenced by light absorption of blood on illumination light in the abnormal portion such as the bleeding site. Thus, in the second embodiment, the R component is used as a specific wavelength component that is specified according to a degree of absorption or scattering in the living body.

Figure 12:
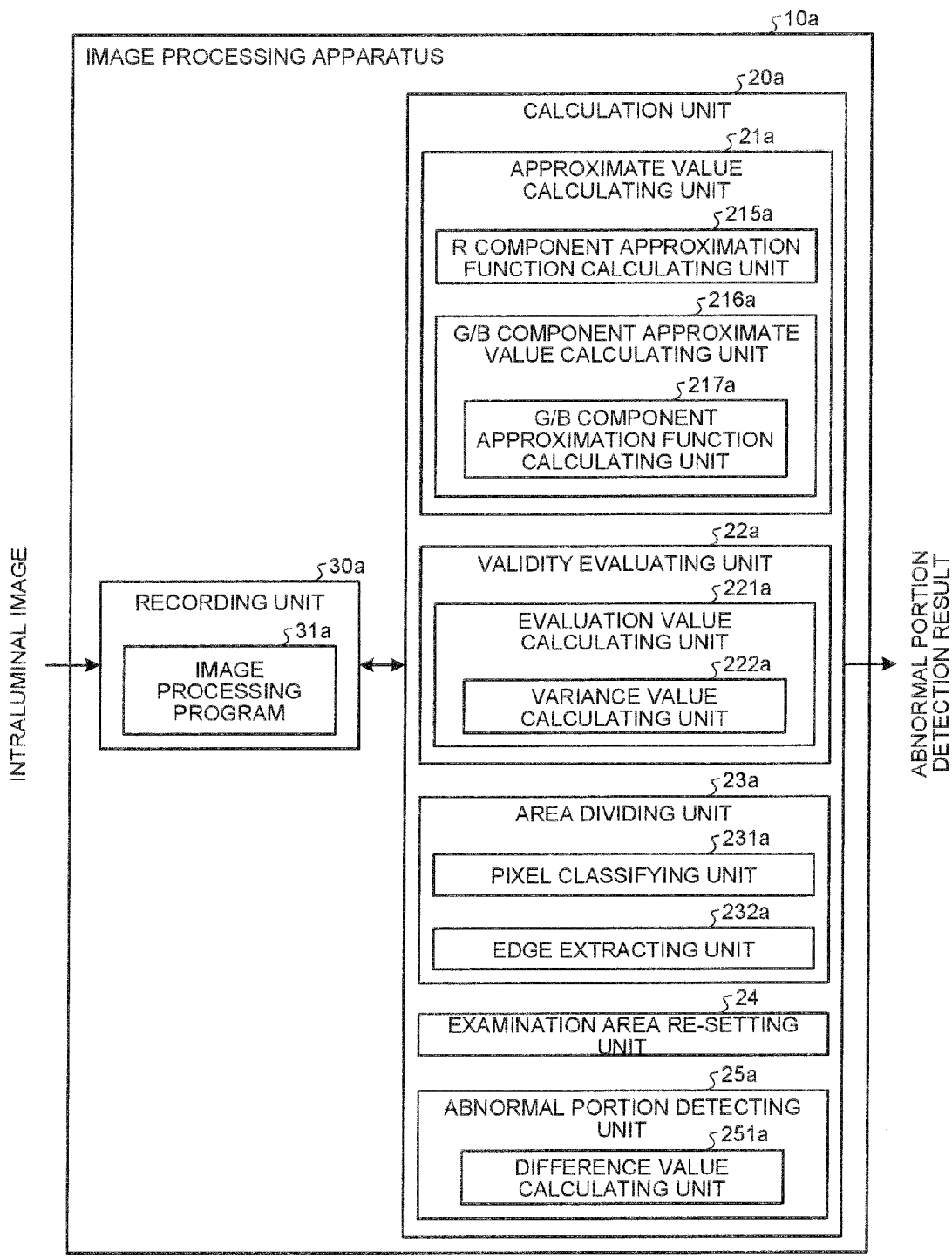
FIG. 12 is a schematic block diagram for explaining a main configuration of an image processing apparatus according to a second embodiment.

FIG. 12 is a schematic block diagram for explaining a main configuration of an image processing apparatus 10a according to the second embodiment. The same configuration as the configuration described in the first embodiment is denoted by the same reference numeral. As illustrated in FIG. 12, the image processing apparatus 10a according to the second embodiment includes a calculation unit 20a and a recording unit 30a. For example, the image processing apparatus 10a is integrated into the endoscope similarly to the first embodiment. The image processing apparatus 10a receives the intraluminal image captured by the endoscope and outputs an abnormal portion detection result obtained by processing the intraluminal image.

The calculation unit 20a includes an approximate value calculating unit 21a, a validity evaluating unit 22a, an area dividing unit 23a, an examination area re-setting unit 24, and an abnormal portion detecting unit 25a.

The approximate value calculating unit 21a calculates the approximate value of each wavelength component using the pixel value of each pixel of the examination area for each wavelength component. In the second embodiment, the approximate value calculating unit 21a calculates the approximate value of the R component of the pixel of the examination area. The approximate value calculating unit 21a includes an R component approximation function calculating unit 215a and a G/B component approximate value calculating unit 216a as an additional wavelength component approximate value calculating unit.

The R component approximation function calculating unit 215a calculates an approximation function of an input value to an output value in which the coordinates of the pixel of the examination area are the input value, and the R component of the pixel value at the coordinates used as the input value is the output value and uses the calculated approximation function as the approximation function on the R component of the examination area. The G/B component approximate value calculating unit 216a calculates the approximate value of the G component and the approximate value of the B component based on the approximate value of the R component. The G/B component approximate value calculating unit 216a includes a G/B component approximation function calculating unit 217a as an additional wavelength component approximation function calculating unit. The G/B component approximation function calculating unit 217a calculates approximation function on each of G component and B component.

The validity evaluating unit 22a evaluates whether or not the approximate value of the specific wavelength component is valid based on the R component of each pixel of the examination area. The validity evaluating unit 22a includes an evaluation value calculating unit 221a having a variance value calculating unit 222a and performs processing based on the R component of each pixel of the examination area in a similar manner to the first embodiment.

The area dividing unit 23a divides the examination area, on which the validity evaluating unit 22a has evaluated the approximate value as invalid, based on the R component of each pixel and the approximate value of the R component. The area dividing unit 23a includes a pixel classifying unit 231a and an edge extracting unit 232a. The area dividing unit 23a performs processing based on the R component of each pixel of the examination area and the approximate value thereof in a similar manner to the first embodiment.

The abnormal portion detecting unit 25a detects the abnormal portion based on the pixel value of each pixel of the intraluminal image for each wavelength component and the approximate value of each wavelength component of each pixel that has been evaluated as valid by the validity evaluating unit 22a. The abnormal portion detecting unit 25a includes a difference value calculating unit 251a that calculates a difference value between the pixel value and the approximate value of each pixel of the intraluminal image for each of the R, G, and B wavelength components.

Further, in the recording unit 30a, an image processing program 31a for implementing processing of the second embodiment and detecting the abnormal portion from the intraluminal image is recorded.

Figure 13:
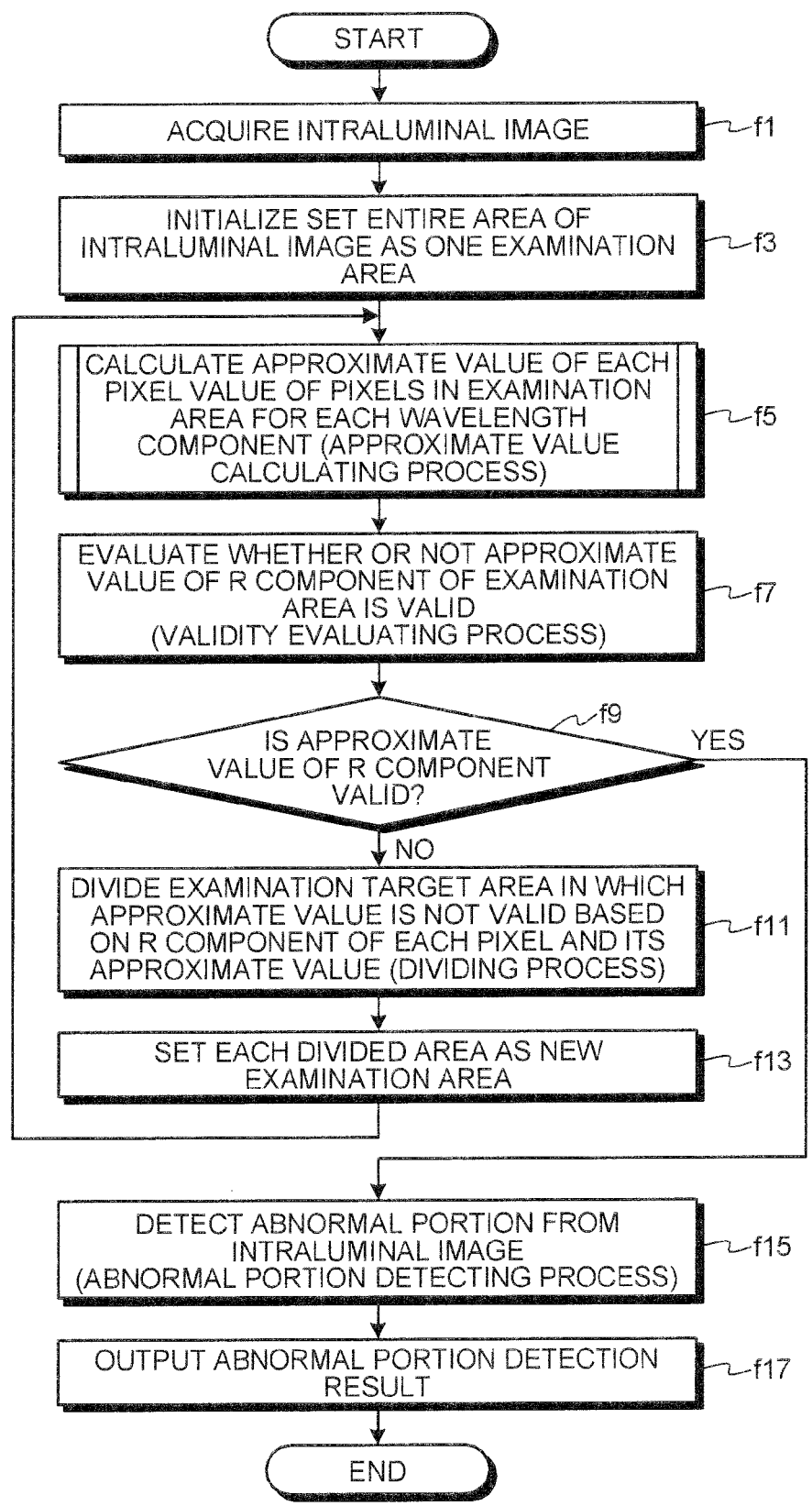
FIG. 13 is an overall flowchart illustrating a processing sequence performed by the image processing apparatus according to the second embodiment.

Next, a detailed processing sequence performed by the image processing apparatus 10a according to the second embodiment will be described. FIG. 13 is an overall flowchart illustrating a processing sequence performed by the image processing apparatus 10a according to the second embodiment. The process described below is implemented by executing the image processing program 31a recorded in the recording unit 30a through the calculating unit 20a.

As illustrated in FIG. 13, similarly to the first embodiment, the calculation unit 20a first acquires the intraluminal image to be processed (step f1). Then, the calculating unit 20a initializes the entire area of the intraluminal image to be processed acquired in step f1 as the examination area (step f3).

Figure 14:
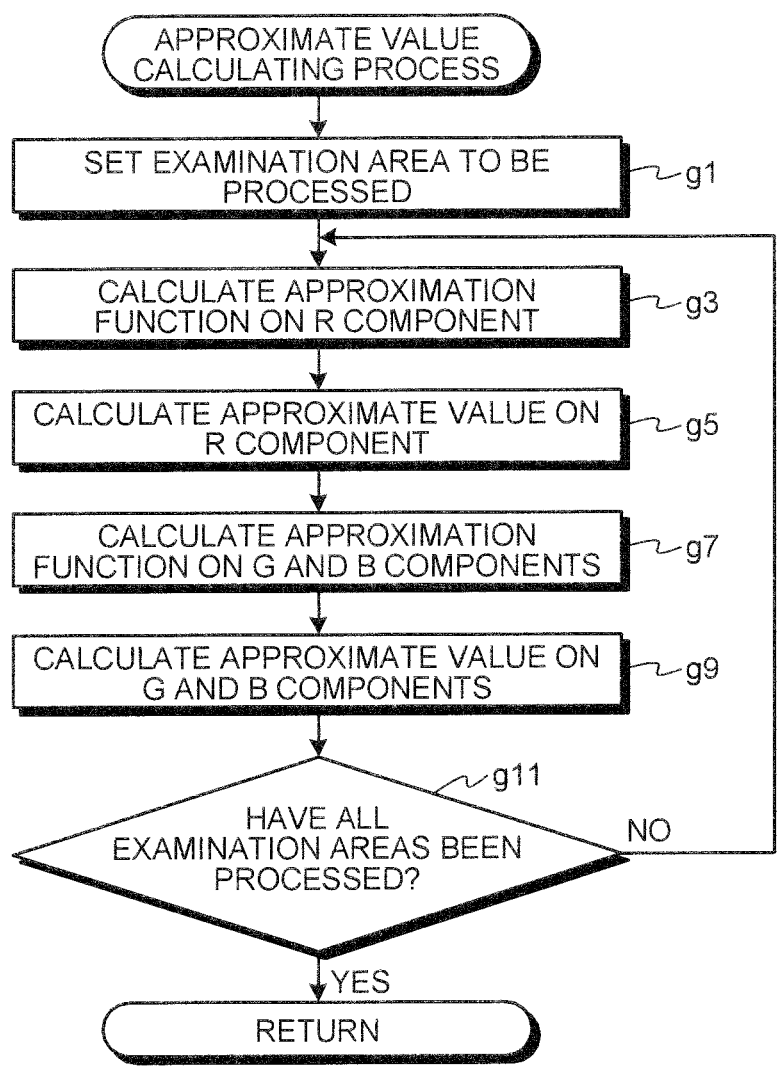
FIG. 14 is a flowchart illustrating a detailed processing sequence of an approximate value calculating process according to the second embodiment.

Next, the approximate value calculating unit 21a executes an approximate value calculating process and calculates the approximate value of the pixel value of each pixel of the examination area for each of the wavelength components (step f5). FIG. 14 is a flowchart illustrating a detailed processing sequence of the approximate value calculating process according to the second embodiment.

As illustrated in FIG. 14, in the approximate value calculating process according to the second embodiment, the approximate value calculating unit 21a first sets the examination area to be processed (step g1).

Next, the R component approximation function calculating unit 215a calculates the approximation function on the R component of each pixel of the examination area to be processed (step g3). This may be implemented by executing the processes of step b3 to step b11 of FIG. 7 described in the first embodiment on the R component using the value of the R component of each pixel of the examination area as the pixel value. Next, the approximate value calculating unit 21a calculates the approximate value of the R component of each pixel of the examination area to be processed (step g5). This may be implemented by executing the process of step b13 of FIG. 7 on the R component using the approximation function calculated in step g3.

Next, the G/B component approximation function calculating unit 217a calculates the approximation functions on the G and B components of the examination area to be processed (step g7). In this example, two methods are used as the calculation method. In subsequent step f7 of FIG. 13, it is evaluated whether or not the approximate value of the R component in the examination area is valid. Then, in step f11, the examination area in which the approximate value of the R component has been evaluated as invalid is divided based on the R component of each pixel and the approximate value thereof. In step g7 of FIG. 14, using any one of methods described below, the approximate values on the G and B components are calculated for each examination area evaluated or divided based on the R component and the approximate value thereof.

First, as a first method, the G/B component approximation function calculating unit 217a calculates the approximation functions on the G and B components of each pixel of the examination area to be processed. This may be implemented by executing the processes of step b3 to step b11 of FIG. 7 on the G and B components using the values of the G and B components of each pixel of the examination area as the pixel value.

As a second method, the G/B component approximation function calculating unit 217a calculates the approximation functions on the G and B components by transforming the approximate value of the R component of the examination area to approximate to values of the G and B components of each pixel of the examination area. The wavelength components are different in size of the value, but a pixel value change caused by a structure of an imaging target change on almost the same curved surface. Thus, in the second embodiment, as described above, the G and B approximation functions are calculated and the approximate values thereof are calculated using the approximate value of the R component best corresponding to the structure of the imaging target. Specifically, the G/B component approximation function calculating unit 217a calculates an approximation function of an input value to an output value in which the approximate value of the R component of the pixel of the examination area is the input value and the pixel value of the G component of the pixel of the approximate value used as the input value is the output value and uses the calculated approximation function as the approximation function on the G component of the examination area. Similarly, the G/B component approximation function calculating unit 217a calculates an approximation function of an input value to an output value in which the approximate value of the R component of the pixel of the examination area is the input value and the pixel value of the B component of the pixel of the approximate value used as the input value is the output value and uses the calculated approximation function as the approximation function on the B component of the examination area.

In the present example, as the approximation function, linear functions represented by Equations (3) and (4) are used. Here, z'R represents the approximate value of the R component of each pixel of the examination area. zG represents the pixel value of the G component of each pixel of the examination area, and zB represents the pixel value of the B component of each pixel of the examination area. Further, a higher order approximation function may be used.

$$zG = g_1 \times z'R + h1 \quad (3)$$

$$zB = g_2 \times z'R + h2 \quad (4)$$

Here, coefficients $g_1$ and $h_1$ of the function formula of Equation (3) are obtained from the approximate value $z'R_i$ (i=1 to n, where n is the number pixels) of the R component of the pixel of the examination area and the pixel value zG of the G component according to the following Equation (5) obtained by the least-square method. Similarly, coefficients $g_2$ and $h_2$ of the function formula of Equation (4) are obtained from the approximate value $z'R_i$ (i=1 to n, where n is the number pixels) of the R component of the pixel of the examination area and the pixel value zB of the B component according to the following Equation (6) obtained by the least-square method.

$$\begin{bmatrix} g_1 \\ h_1 \end{bmatrix} = (A^t \times A)^{-1} \times A^t \times \begin{bmatrix} zG_1 \\ zG_2 \\ \vdots \\ zG_n \end{bmatrix} \quad (5)$$

$$\begin{bmatrix} g_2 \\ h_2 \end{bmatrix} = (A^t \times A)^{-1} \times A^t \times \begin{bmatrix} zB_1 \\ zB_2 \\ \vdots \\ zB_n \end{bmatrix} \quad (6)$$

where $$A = \begin{bmatrix} z'R_1 & 1 \\ z'R_2 & 1 \\ \vdots & \vdots \\ z'R_n & 1 \end{bmatrix}$$

Next, the G/B component approximate value calculating unit 216a calculates the approximate values on the G and B components of the pixel value of each pixel of the examination area to be processed, respectively (step g9). This may be implemented by executing the process of step b13 of FIG. 7 on the G and B components using the approximation functions calculated in step g7, respectively.

Thereafter, the approximate value calculating unit 21a determines whether or not all of the examination areas have been processed. When it is determined that all of the examination areas have not been processed (No in step g11), step g3 to step g9 are repeated. Meanwhile, when it is determined that all of the examination areas have been processed (Yes in step g11), the process returns to step f5 of FIG. 13 and then proceeds to step f7.

Then, in step f7, the validity evaluating unit 22a executes a validity evaluating process and evaluates whether or not the approximate value of the R component of the examination area is valid. This may be implemented by executing the validity evaluating process of FIG. 8 described in the first embodiment on the R component.

Then, after the validity evaluating process, it is determined whether or not the approximate values of the R component of all of the examination areas have been evaluated as valid. When it is determined that the approximate values of the R components of all of the examination areas have been evaluated as valid (Yes in step f9), the process shifts to step f15.

Meanwhile, when it is determined that the approximate values of the R component have not been evaluated as valid (No in step f9), the area dividing unit 23a executes a dividing process and divides the examination area in which the approximate value has been evaluated as invalid (step f11). In the dividing process according to the second embodiment, the area dividing unit 23a performs the dividing process based on the R component of each pixel of the examination area in which the approximate value has been evaluated as invalid and the approximate value thereof. This may be implemented by executing the dividing process of FIG. 9 described in the first embodiment on the R component.

Then, similarly to the first embodiment, the examination area re-setting unit 24 sets each area divided in step f11 as a new examination area (step f13). Then, the process returns to step f5 and is repeated.

Meanwhile, when it is determined that the approximate values of all of the examination areas are evaluated as valid (Yes in step f9), the abnormal portion detecting unit 25a executes an abnormal portion detecting process and detects the abnormal portion from the intraluminal image to be processed (step f15). In the abnormal portion detecting process according to the second embodiment, for example, the abnormal portion detecting unit 25a first calculates the difference value between the pixel value and the approximate value of each pixel of the intraluminal image for each wavelength component. Then, threshold processing is performed, for example, on an average value or a maximum value of the difference value of each wavelength component, and an area configured with a pixel in which the average value or the maximum value of the difference value is equal to or more than a predetermined threshold value is detected as the abnormal portion.

As described above, according to the second embodiment, the same effect as in the first embodiment can be obtained. Further, the R component that is the wavelength component that is difficult to be absorbed into or scattered in the living body is set as the specific wavelength component, and the approximate values of the G and B components can be calculated for each divided examination area using the R component. Thus, the approximate value in which influence of the pixel value change by absorption of light is reduced can be obtained, and the abnormal portion can be detected with a higher degree of accuracy.

Third Embodiment

Figure 15:
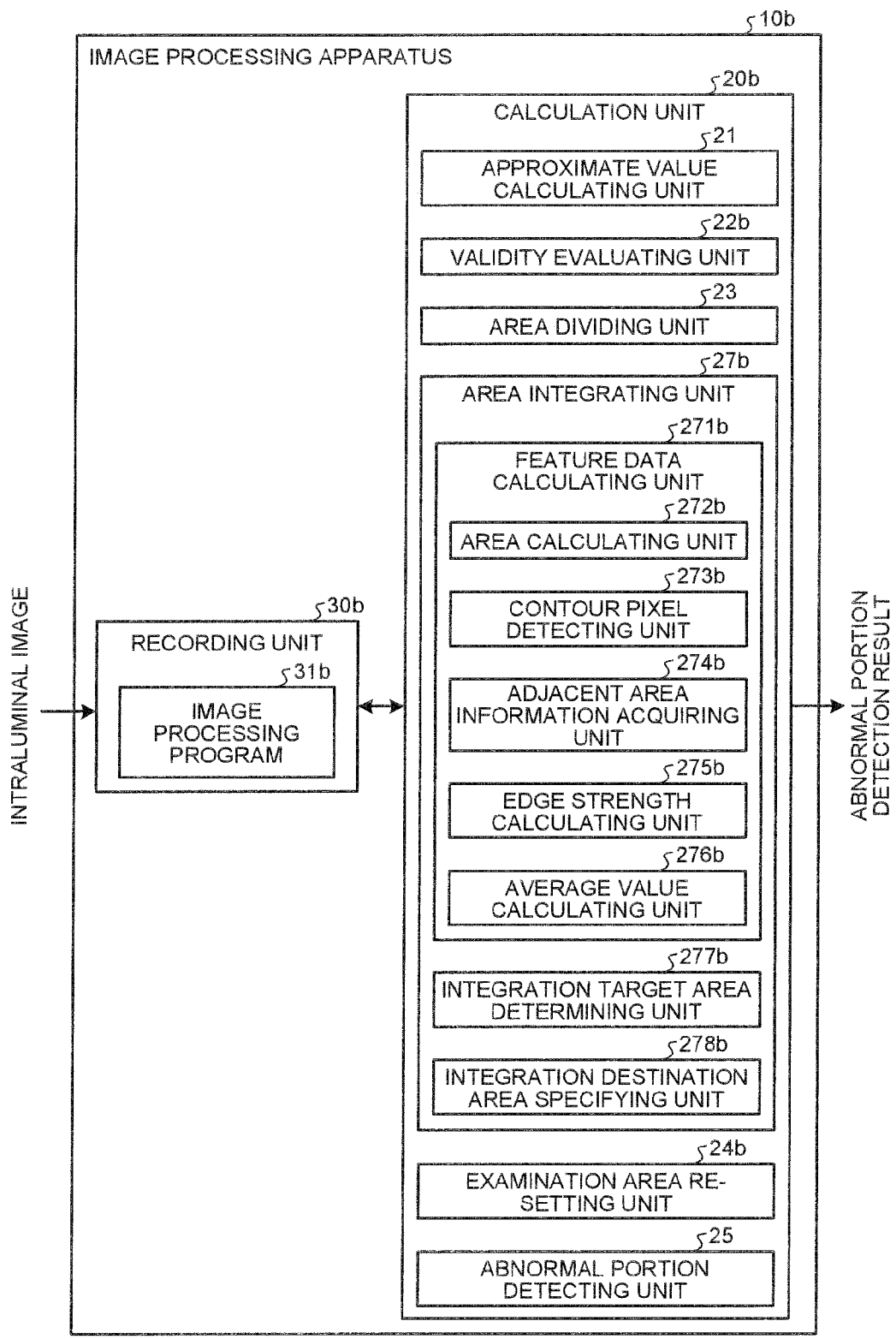
FIG. 15 is a schematic block diagram for explaining a main configuration of an image processing apparatus according to a third embodiment.

First, a configuration of an image processing apparatus according to a third embodiment will be described. FIG. 15 is a schematic block diagram for explaining a main configuration of an image processing apparatus 10b according to the third embodiment. The same configuration as the configuration described in the first embodiment is denoted by the same reference numeral. As illustrated in FIG. 15, the image processing apparatus 10b according to the third embodiment includes a calculation unit 20b and a recording unit 30b. For example, the image processing apparatus 10b is integrated into the endoscope similarly to the first embodiment. The image processing apparatus 10b receives the intraluminal image captured by the endoscope and outputs an abnormal portion detection result obtained by processing the intraluminal image.

The calculation unit 20b includes an approximate value calculating unit 21, a validity evaluating unit 22b, an area dividing unit 23, an area integrating unit 27b, a examination area re-setting unit 24b, and an abnormal portion detecting unit 25.

Similarly to the first embodiment, the validity evaluating unit 22b includes an evaluation value calculating unit, and the evaluation value calculating unit includes a variance value calculating unit, but not shown in FIG. 15.

The area integrating unit 27b integrates the areas divided by the area dividing unit 23 until each area satisfies a predetermined condition. The area integrating unit 27b includes a feature data calculating unit 271b, an integration area determining unit 277b, and an integration destination area specifying unit 278b. The feature data calculating unit 271b calculates feature data of each area. The feature data calculating unit 271b includes an area calculating unit 272b, a contour pixel detecting unit 273b, an adjacent area information acquiring unit 274b, an edge strength calculating unit 275b, and an average value calculating unit 276b. The area calculating unit 272b calculates an area size of each area. The contour pixel detecting unit 273b detects the contour pixel of each area. The adjacent area information acquiring unit 274b acquires identification information of an adjacent area adjacent to the contour pixel. The edge strength calculating unit 275b calculates the edge strength of the contour pixel. The average value calculating unit 276b calculates an average value of the edge strength of pixels adjacent to a corresponding adjacent area for each adjacent area. The integration area determining unit 277b determines whether or not each area is an integration area using the area size of each area as the feature data. The integration destination area specifying unit 278b specifies an integration destination area that is the destination where the integration area is integrated.

The examination area re-setting unit 24b sets each area integrated by the area integrating unit 27b as a new examination area and controls a repetition of processing.

Further, in the recording unit 30b, an image processing program 31b for implementing processing of the third embodiment and detecting the abnormal portion from the intraluminal image is recorded.

Figure 16:
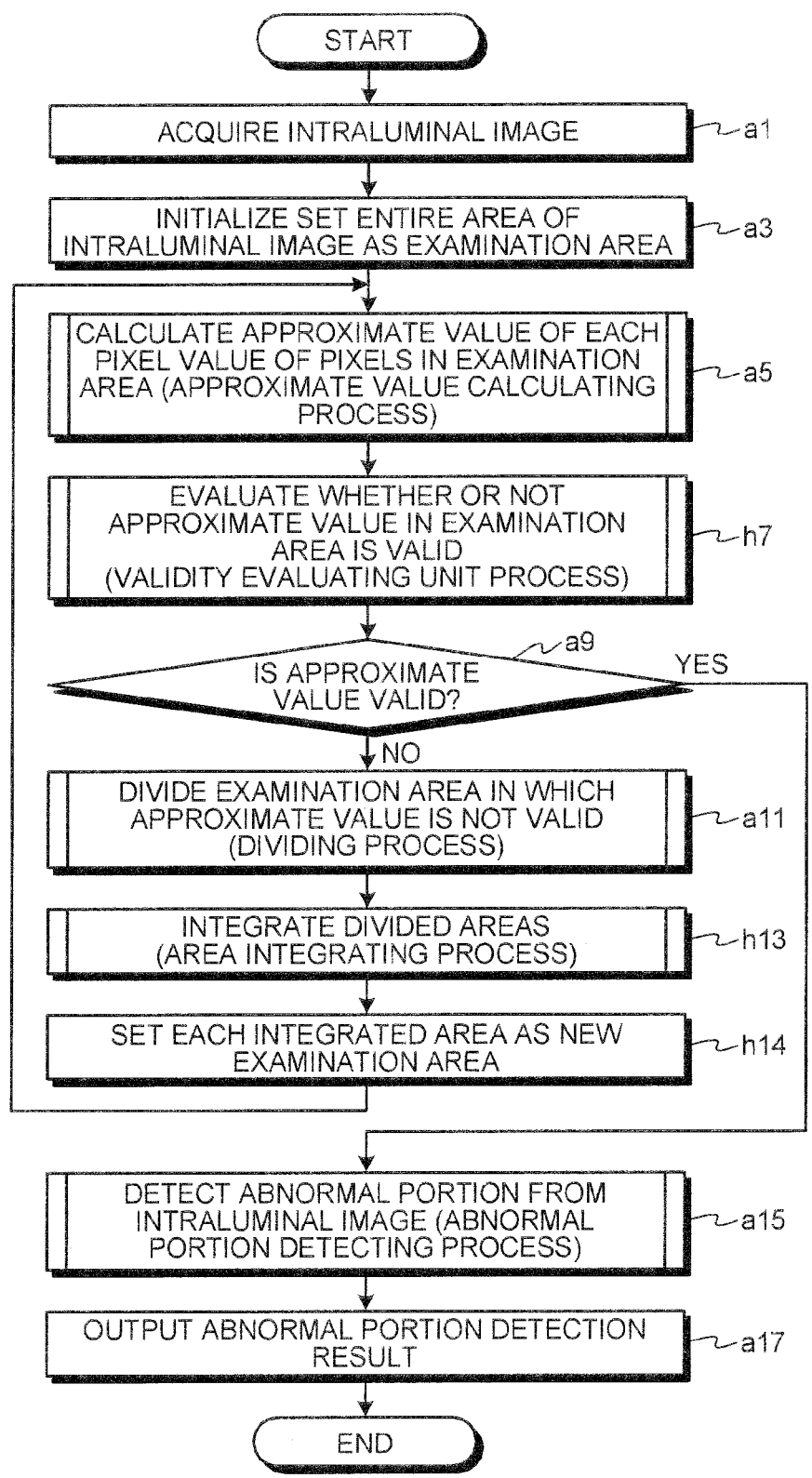
FIG. 16 is an overall flowchart illustrating a processing sequence performed by the image processing apparatus according to the third embodiment.

Next, a detailed processing sequence performed by the image processing apparatus 10b according to the third embodiment will be described. FIG. 16 is an overall flowchart illustrating a processing sequence performed by the image processing apparatus 10b according to the third embodiment. The process described below is implemented by executing the image processing program 31b recorded in the recording unit 30b through the calculating unit 20b. In FIG. 16, the same processing step as in the first embodiment is denoted by the same reference numeral.

As illustrated in FIG. 16, in the third embodiment, after the approximate value calculating process is performed in step a5, the validity evaluating unit 22b executes a validity evaluating process (step h7). The validity evaluating process is performed by the same processing sequence as in the first embodiment described with reference to FIG. 8, but when calculating the variation value σ of the examination area to be processed in step c3 of FIG. 8, the variance value calculating unit of the validity evaluating unit 22b treats a pixel inside an area (an integration area) that is determined as an integration area in step i3 in a subsequent area integrating process (see FIG. 17) and integrated with an integration destination area in step i17 in the same manner as the outlier pixel. That is, the variance value calculating unit of the validity evaluating unit 22b sets the weight of the pixel inside the integration area to "0" when the examination area to be processed is an area in which the integration area is integrated with the integration destination area. Then, the variance value calculating unit of the validity evaluating unit 22b calculates the variance value σ after multiplying the difference between the approximate value z' and the actual pixel value z of each pixel inside the integration area by the weight of "0" similarly to the pixel with the outlier and excluding the difference with the pixel inside the integration area.

Further, in the third embodiment, similarly to the first embodiment, in step a11, the area dividing unit 23 performs the dividing process. At this time, in the third embodiment, in order to identify each divided area in the subsequent area integrating process, identification information is set to each divided area using a known labeling process.

Figure 17:
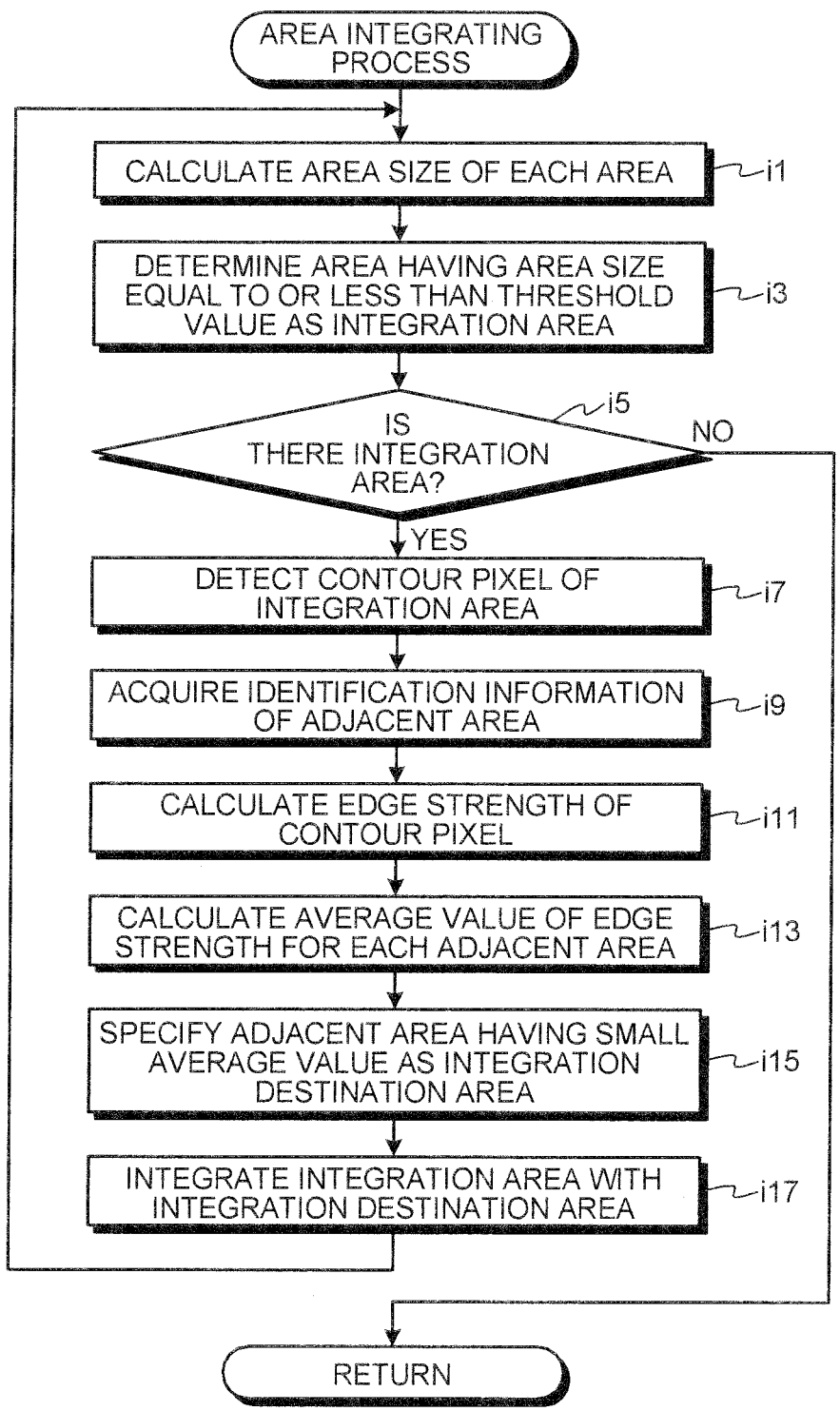
FIG. 17 is a flowchart illustrating a detailed processing sequence of an area integration process.
Figure 18:
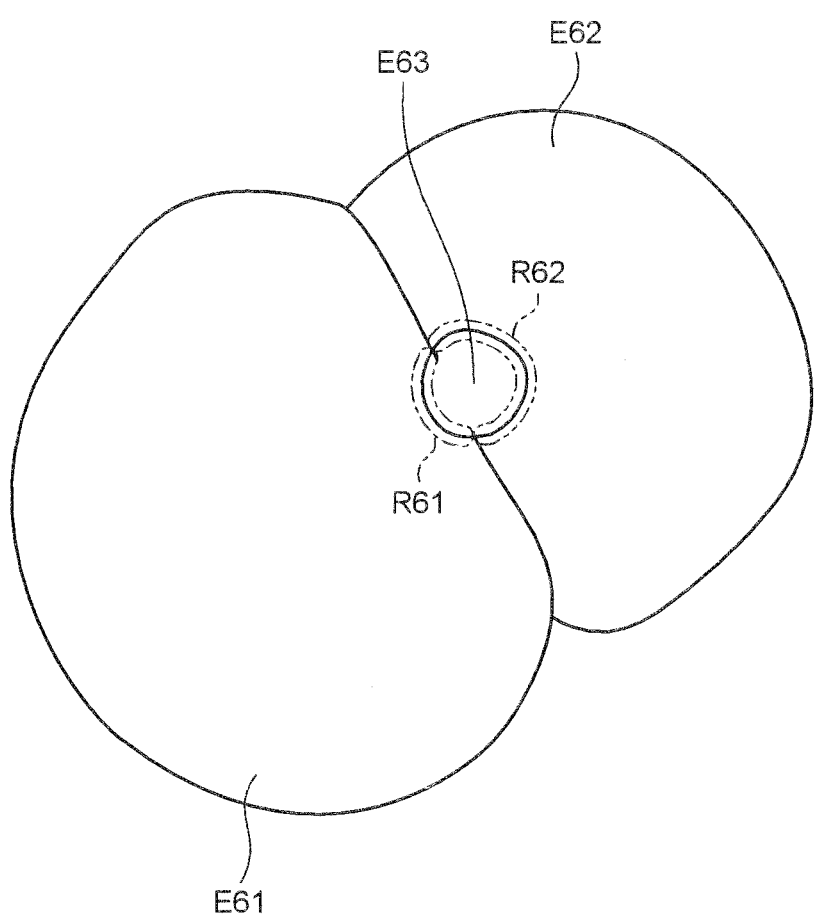
FIG. 18 is an explanatory diagram for explaining the principle of an area integrating process.

After the dividing process in step a11, the area integrating unit 27b executes the area integrating process and integrates the areas divided in step a11 (step h13). FIG. 17 is a flowchart illustrating a detailed processing sequence of the area integration process. FIG. 18 is an explanatory diagram for explaining the principle of the area integrating process and schematically illustrates three divided areas.

As illustrated in FIG. 17, in the area integrating process, the area calculating unit 272b first calculates the area size of each divided area (step i1). Next, the integration area determining unit 277b performs threshold processing on the area size of each divided area and determines the divided area having the area size equal to or less than a predetermined threshold value as the integration area (step i3). For example, in FIG. 18, it is assumed that the area size of an area E63 between an area E61 and an area E62 is equal to or less than a predetermined threshold value. In this case, in step i3, the area E63 is determined as the integration area.

Next, the area integrating unit 27b determines whether or not the integration area is present. When it is determined that the integration area is present (Yes in step i5), the contour pixel detecting unit 273b detects the contour pixel of the integration area to be processed (step i7). This may be implemented using known contour tracing (reference: "Digital image processing", CG-ARTS society, P178, *Contour tracing*).

Next, the adjacent area information acquiring unit 274b acquires identification information of an area (adjacent area) adjacent to the detected contour pixel (step i9). For example, in FIG. 18, the adjacent areas adjacent to the contour pixel of the area E63 determined as the integration area are the area E61 and the area E62. In step i9, identification information of the areas E61 and E62 are acquired.

Next, the edge strength calculating unit 275b calculates the edge strength of the contour pixel (step i11). This may be implemented using a known differential filter (reference: "Digital image processing", CG-ARTS society, P114, *Differential filter*). Next, the average value calculating unit 276b calculates an average value of the edge strength of the contour pixels having the same adjacent area (step i13). For example, as illustrated in FIG. 18, among the adjacent pixels of the area E63, adjacent pixels within a range R61, encircled by an alternate long and short dash line, at the left side in FIG. 18 are adjacent to the area E61 that is one adjacent area. Meanwhile, adjacent pixels within a range R62, encircled by an alternate long and two short dashes line, at the right side in FIG. 18 are adjacent to the area E62 that is the other adjacent area. In this case, in step i13, the average value of the edge strength of the adjacent pixels within the range R61 and the average value of the edge strength of the adjacent pixels within the range R62 are calculated, respectively.

Next, the integration destination area specifying unit 278b specifies the adjacent area that is small in average value of the edge strength as the integration destination area (step i15). For example, in FIG. 18, when the average value of the edge strength of the adjacent pixels within the range R62 is smaller than the average value of the edge strength of the adjacent pixels within the range R61, the adjacent area E62 is specified as the integration destination area. Thus, integration with the adjacent area that is small in edge present in the boundary is implemented. A method of specifying the integration destination area is not limited to the above example, and for example, a method of specifying an adjacent area having the most contour pixels as the integration destination area may be used. In the example of FIG. 18, since the number of contour pixels within the range R62 is larger than the number of contour pixels within the range R61, the area E62 is specified as the integration destination area. Then, the area integrating unit 27b integrates the integration area to be processed with the specified integration destination area (step i17). Further, when the integration area is included in another area, the area including the integration area may be integrated as the integration destination area. Whether to be included can be determined since the number of adjacent areas in the contour pixel is one.

Thereafter, returning to step i1, integration is repeated until it is determined that there is no integration area, that is, until an area having the area size equal to or less than a predetermined threshold value is not present. Then, when it is determined that there is no integration area (No in step i5), the process returns to step h13 of FIG. 16 and then proceeds to step h14.

In step h14, the examination area re-setting unit 24b sets each area integrated in step h13 as a new examination area, and the process returns to step a5 and is repeated.

As described above, according to the third embodiment, the same effect as in the first embodiment can be obtained, and after the examination area is divided, the area having the small area size can be integrated with the adjacent area. In the first embodiment, when the approximate value is calculated without excluding the outlier, if the area of the abnormal portion is divided as one area by dividing the examination area and the approximate value appropriate to that pixel value change is calculated, there arises a problem in that the abnormal portion may be difficult to be detected. Here, when the area size of the area of the abnormal portion is small to some extent, by integrating the area having the small area size with the adjacent area, a situation that the approximate value according to the pixel value change of only the abnormal portion is calculated can be prevented, and the abnormal portion can be detected with a higher degree of accuracy.

Furthermore, the image processing apparatus 10 according to the first embodiment, the image processing apparatus 10a according to the second embodiment, and the image processing apparatus 10b according to the third embodiment described above can be implemented by executing a program prepared in advance through a computer system such as a personal computer (PC) or a workstation. Hereinafter, a computer system that has the same functions as those of the image processing apparatuses 10, 10a, and 10b described in the first to third embodiments and executes the image processing programs 31, 31a, and 31b will be described.

Figure 19:
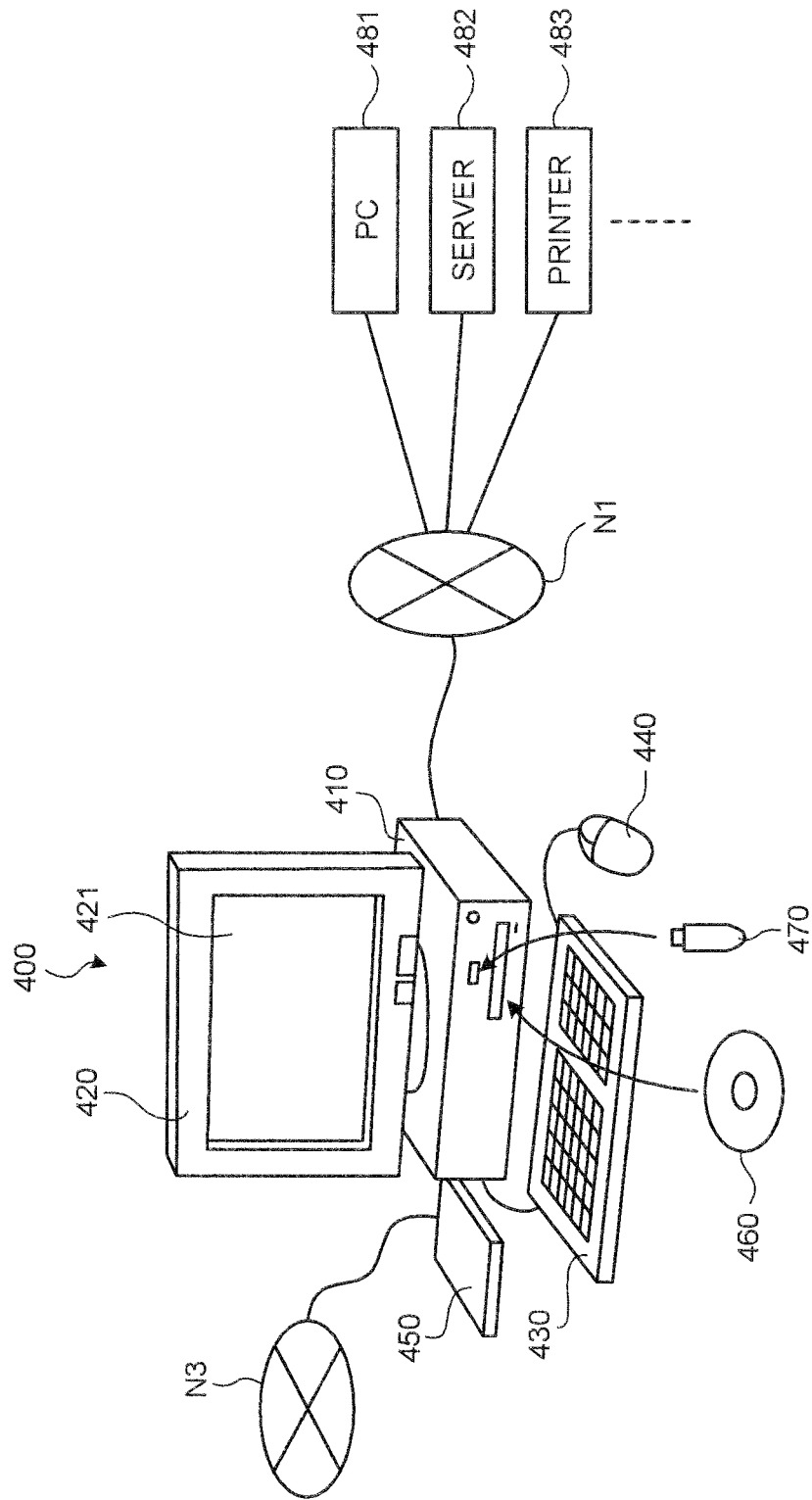
FIG. 19 is a system configuration diagram illustrating a configuration of a computer system to which the present invention is applied.
Figure 20:
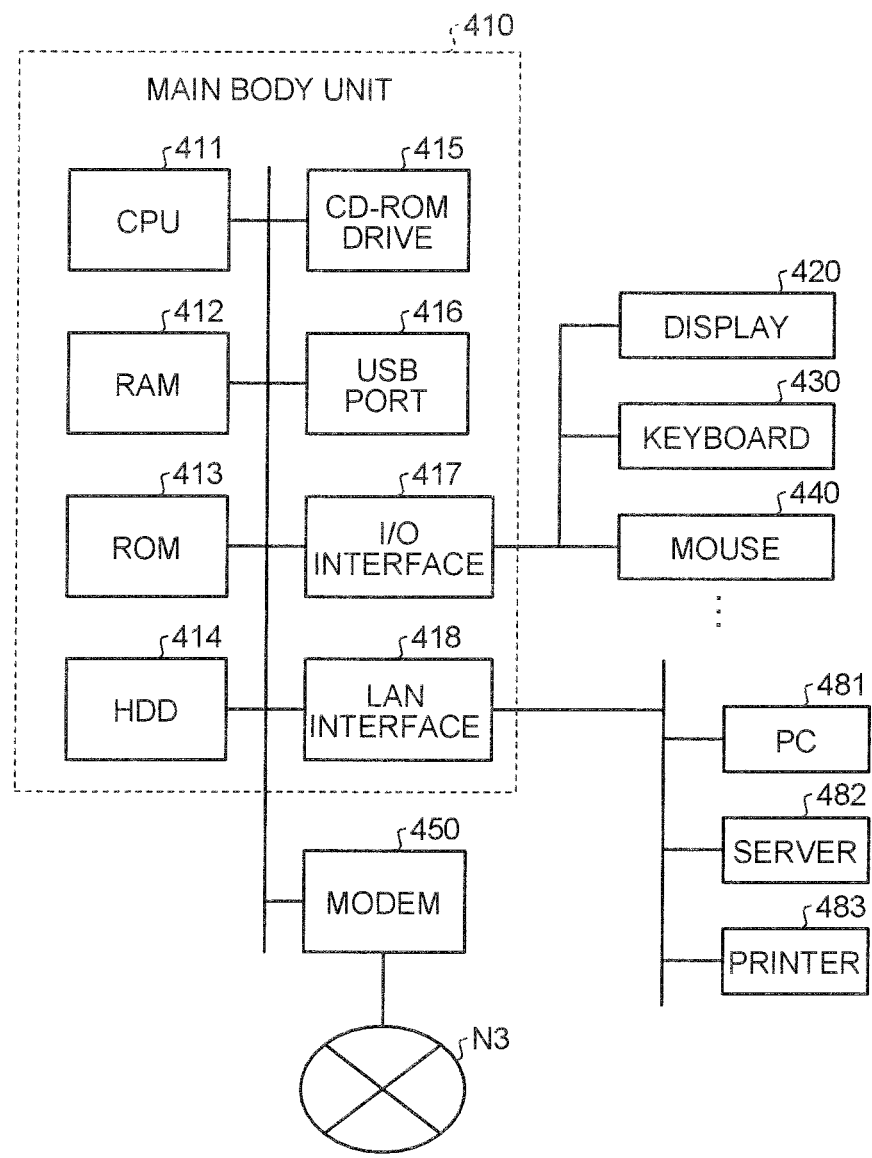
FIG. 20 is a block diagram illustrating a configuration of a main body unit that configures the computer system of FIG. 19.

FIG. 19 is a system configuration diagram illustrating a configuration of a computer system 400 according to the present modification, and FIG. 20 is a block diagram illustrating a configuration of a main body unit 410 that configures the computer system 400. As illustrated in FIG. 19, the computer system 400 includes a main body unit 410, a display 420 that is configured to display information such as an image on a display screen 421 in accordance with an instruction transmitted from the main body unit 410, a keyboard 430 that is configured to input various types of information to the computer system 400, and a mouse 440 that is configured to designate an arbitrary position on the display screen 421 of the display 420.

In addition, as illustrated in FIGS. 19 and 20, the main body unit 410 of the computer system 400 includes a CPU 411, a RAM 412, a ROM 413, a hard disk drive (HDD) 414, a CD-ROM drive 415 that accepts a CD-ROM 460, a universal serial bus (USB) port 416 to which a USB memory 470 is detachably connected, an I/O interface 417 that connects the display 420, the keyboard 430, and the mouse 440, and a local area network (LAN) interface 418 that is configured to be connected to a local area network or a wide area network (LAN/WAN) N1.

Furthermore, a modem 450 that is configured to be connected to a public circuit N3 such as the Internet, a PC 481 as another computer system, a server 482, a printer 483, and the like are connected to this computer system 400 through the LAN interface 418 and the LAN/WAN N1.

The computer system 400 implements the image processing apparatus (for example, the image processing apparatus 10 according to the first embodiment, the image processing apparatus 10a according to the second embodiment, or the image processing apparatus 10b according to the third embodiment) by reading out and executing an image processing program (for example, the image processing program 31 according to the first embodiment, the image processing program 31a according to the second embodiment, or the image processing program 31b according to the third embodiment) stored in a recording medium. Here, the recording media includes all types of recording media, in which an image processing program is recorded to be readable by the computer system 400, such as a "portable-type physical medium" including a magneto optical (MO) disc, a digital versatile disc (DVD) disc, a flexible disc, (FD), an IC card, and the like in addition to a CD-ROM 460 and a USB memory 470, a "fixed-type physical medium" including an HDD 414, a RAM 412, a ROM 413, or the like that is internally or externally included in the computer system 400, and a "communication medium" that stores a program for a short time when the program is transmitted such as a public circuit N3 that is connected through the modem 450, the LAN/WAN N1 to which the PC 481 as another computer system or the server 482 is connected, and the like.

In other words, the image processing program is recorded in a recording medium such as the "portable-type physical medium", the "fixed-type physical medium", or the "communication medium" in a computer-readable form, and the image processing apparatus is implemented by reading out the image processing program from the recording medium and executing the image processing program by the computer system 400. The image processing program is not limited to execution by the computer system 400, and the present invention can be similarly applied to a case where the PC 481 as another computer system or the server 482 executes the image processing program or a case where the PC 481 and the server 482 cooperatively execute the image processing program.

Further, the above embodiments have been described in connection with the image processing apparatus that is integrated into the endoscope and processes the intraluminal image captured by the endoscope. However, the intraluminal image regarded as being processed by the image processing apparatus of the present invention is not limited to the image captured by the endoscope. For example, an easting-type endoscope (capsule endoscope) has been recently developed which has an imaging device, a communication device that transmits image data captured by the imaging device to the outside of the body in a wireless manner, and the like within a capsule-type casing, and the present invention can be similarly applied to the case of processing the intraluminal image captured by the capsule endoscope.

In addition, the present invention is not limited to the first to third embodiments described above and the modifications thereof, and various inventions can be configured by appropriately combining a plurality of constituent elements disclosed in the embodiments and the modifications. For example, a configuration may be made such that several constituent elements are excluded from all the constituent elements illustrated in each embodiment or each modification. Alternatively, the constituent elements illustrated in other embodiments and other modifications may be appropriately combined.

According to an aspect of the present invention described above, there is an advantage that the abnormal portion having the pixel value different from the neighboring pixels can be detected with a high degree of accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
   a processor; and
   a memory storing computer-readable instructions that, when executed by the processor, implement:
   an approximate value calculating unit that calculates approximate values for respective pixel values of pixels of an examination area so that the approximate values are continuous within the examination area, based on the pixel values of the pixels of the examination area in an image;
   a validity evaluating unit that evaluates whether the approximate values are valid as the pixel values of the examination area;
   an area dividing unit that divides an examination area with the approximate values determined to be invalid by the validity evaluating unit into a plurality of examination areas;
   an examination area re-setting unit that sets each area obtained by dividing the examination area by the area dividing unit as a new examination area and controls a repetition of processing; and
   an abnormal portion detecting unit that detects an abnormal portion based on the pixel values of the pixels in the image and the approximate values determined to be valid by the validity evaluating unit;

wherein the validity evaluating unit includes an evaluation value calculating unit that calculates an evaluation value representing an approximation degree of at least one approximate value relative to at least one respective pixel value of the pixels of the examination area and evaluates whether the at least one approximate value is valid based on the evaluation value;

wherein the evaluation value calculating unit calculates the evaluation value based on a difference between the at least one approximate value and the at least one respective pixel value of the pixels of the examination area;

wherein the approximate value calculating unit calculates an approximate surface for the pixel value of each pixel of the examination area and sets a value on the approximate surface for each pixel of the examination area as the approximate value;

wherein the approximate value calculating unit includes an approximation function calculating unit that calculates an approximation function of an input value for an output value, the input value indicating coordinates of a pixel in an examination area, and the output value indicating a pixel value at the coordinates used as the input value, and wherein the output value of the approximation function is defined as the approximate value for the pixel value of the pixel such that the approximate surface is obtained by the approximation function.

2. The image processing apparatus according to claim 1, wherein the approximate surface is an approximate curved surface and the approximate value calculating unit calculates the approximate curved surface for the pixel value of each pixel of the examination area and sets a value on the approximate curved surface for each pixel of the examination area as the approximate value.

3. The image processing apparatus according to claim 1,
wherein the approximation function calculating unit includes a weight setting unit that sets a weight on the pixel of the examination area and calculates the approximation function based on the weight.

4. The image processing apparatus according to claim 3, wherein the weight setting unit includes an outlier detecting unit that detects an outlier pixel of which the pixel value is an outlier from among the pixels of the examination area and sets a lower weight to the outlier pixel than pixels other than the outlier pixel.

5. The image processing apparatus according to claim 3, wherein the weight setting unit includes a contour pixel detecting unit that detects a contour pixel of the examination area and sets a higher weight to the contour pixel than pixels other than the contour pixel.

6. The image processing apparatus according to claim 1, wherein the evaluation value calculating unit includes a variance value calculating unit that calculates a variance value of the examination area, the variance value being obtained from a difference between the pixel value of each pixel and the approximate value for the pixel value in the examination area, the variance value being used as the evaluation value.

7. The image processing apparatus according to claim 1, wherein the area dividing unit includes a pixel classifying unit that compares the pixel value of the pixel of the examination area with the approximate value for the pixel value, for each pixel, and classifies the pixels of the examination area into a first pixel group including the pixels each having a pixel value higher than the approximate value and a second pixel group including the pixels each having a pixel value lower than the approximate value and that divides the examination area in such a manner that a connection area of the pixels classified into the same pixel group by the pixel classifying unit is regarded as one area.

8. The image processing apparatus according to claim 7, wherein the area dividing unit includes an edge extracting unit that extracts an edge of the examination area, divides a connection area in which the pixels classified as the same pixel group by the pixel classifying unit are continuous, using an edge position within the connection area as a boundary, and regards each divided area as one area.

9. The image processing apparatus according to claim 1, wherein the abnormal portion detecting unit detects the abnormal portion by performing threshold processing on the difference between the at least one approximate value and the at least one respective pixel value of the pixels of the examination area.

10. The image processing apparatus according to claim 1, wherein
the image is formed from a plurality of light wavelength components,
the approximate value calculating unit calculates the approximate value for each wavelength component using the pixel value of the pixel of the examination area for each wavelength component,
the validity evaluating unit evaluates whether the approximate value for a specific wavelength component is valid based on the specific wavelength component of the pixel of the examination area, and
the area dividing unit divides the examination area with the approximate value which is determined to be invalid by the validity evaluating unit, based on the specific wavelength component of the pixel of the examination area and the approximate value for the specific wavelength component.

11. The image processing apparatus according to claim 10, wherein the specific wavelength component is a wavelength component specified using a degree of light absorption or light scattering of a living body with respect to illumination light.

12. The image processing apparatus according to claim 1, wherein
the image is formed from a plurality of light wavelength components, and
the approximate value calculating unit calculates the approximate value for a specific wavelength component of the pixel of the examination area, and
the approximate value calculating unit includes an additional wavelength component approximate value calculating unit that calculates the approximate value for an additional wavelength component other than the specific wavelength component based on the approximate value for the specific wavelength component.

13. The image processing apparatus according to claim 12, wherein
the additional wavelength component approximate value calculating unit includes an additional wavelength component approximation function calculating unit that calculates an approximation function of an input value with respect to an output value, the input value indicating the approximate value for the specific wavelength component of the pixel of the examination area, and the output value indicating a pixel value of an additional wavelength component of the pixel, and
the output value of the approximation function is used as the approximate value for the additional wavelength component of the pixel when the approximate value for the specific wavelength component of the pixel of the examination area is used as the input value.

14. The image processing apparatus according to claim 1, further comprising an area integrating unit that integrates divided areas obtained by the area dividing unit until each area satisfies a predetermined condition, wherein the examination area re-setting unit sets each integrated area obtained by the area integrating unit as the new examination area.

15. The image processing apparatus according to claim 14, wherein the area integrating unit includes
a feature data calculating unit that calculates feature data of each area,
an integration area determining unit that determines whether each area is an integration area based on the feature data, and
an integration destination area specifying unit that specifies an integration destination area that is a destination where the integration area is to be integrated, and
each area determined as the integration area is integrated with the integration destination area specified by the integration destination area specifying unit.

16. The image processing apparatus according to claim 15, wherein the feature data calculating unit includes an area calculating unit that calculates an area size of each area, and
the integration area determining unit determines whether each area is the integration area based on the area size.

17. The image processing apparatus according to claim 15, wherein the feature data calculating unit includes
a contour pixel detecting unit that detects a contour pixel of each area, and
an adjacent area information acquiring unit that acquires identification information of adjacent areas adjacent to the contour pixel, and
the integration destination area specifying unit specifies an adjacent area that is most adjacent to the contour pixel among the adjacent areas as the integration destination area.

18. The image processing apparatus according to claim 17, wherein the feature data calculating unit includes
an edge strength calculating unit that calculates an edge strength of the contour pixel, and
an average value calculating unit that calculates an average value of the edge strength of an adjacent pixel with a corresponding adjacent area for each adjacent area, and
the integration destination area specifying unit specifies an adjacent area that is lowest in the average value of the edge strength among the adjacent areas as the integration destination area.

19. An image processing method, comprising:

calculating approximate values that become continuous inside an examination area for respective pixel values of pixels of the examination area based on the pixel values of the pixels of the examination area inside an image;
evaluating whether the approximate values are valid as the pixel values of the examination area;
dividing the examination area with the approximate values that have been evaluated as being invalid into a plurality of examination areas;
setting each area obtained by dividing the examination area as a new examination area and controlling a repetition of processing; and
detecting an abnormal portion based on the pixel values of the pixels inside the image and the approximate values that have been evaluated as being valid as the pixel values of the examination area;
wherein the evaluating whether the approximate values are valid includes calculating an evaluation value representing an approximation degree of at least one approximate value relative to at least one respective pixel value of the pixels of the examination area and evaluating whether the at least one approximate value is valid based on the evaluation value;
wherein the evaluating whether the approximate values are valid includes calculating the evaluation value based on a difference between the at least one approximate value and the at least one respective pixel value of the pixels of the examination area;
wherein the calculating the approximate values includes calculating an approximate surface for the pixel value of each pixel of the examination area and setting a value on the approximate surface for each pixel of the examination area as the approximate value;
wherein the calculating the approximate values includes calculating an approximation function of an input value for an output value, the input value indicating coordinates of a pixel in an examination area, and the output value indicating a pixel value at the coordinates used as the input value, and
wherein the output value of the approximation function is defined as the approximate value for the pixel value of the pixel such that the approximate surface is obtained by the approximation function.

20. A non-transitory computer-readable recording medium with an executable program stored thereon, wherein the program instructs a processor to perform:

calculating approximate values that become continuous inside an examination area for respective pixel values of pixels of the examination area based on the pixel values of the pixels of the examination area inside an image;
evaluating whether or not the approximate values are valid as the pixel values of the examination area;
dividing the examination area with the approximate values that have been evaluated as being invalid into a plurality of examination areas;
setting each area obtained by dividing the examination area as a new examination area and controlling a repetition of processing; and
detecting an abnormal portion based on the pixel values of the pixels inside the image and the approximate values that have been evaluated as being valid as the pixel values of the examination area;
wherein the evaluating whether the approximate values are valid includes calculating an evaluation value representing an approximation degree of at least one approximate value relative to at least one respective pixel value of the pixels of the examination area and evaluating whether the at least one approximate value is valid based on the evaluation value;
wherein the evaluating whether the approximate values are valid includes calculating the evaluation value based on a difference between the at least one approximate value and the at least one respective pixel value of the pixels of the examination area;
wherein the calculating the approximate values includes calculating an approximate surface for the pixel value of each pixel of the examination area and setting a value on the approximate surface for each pixel of the examination area as the approximate value;

wherein the calculating the approximate values includes calculating an approximation function of an input value for an output value, the input value indicating coordinates of a pixel in an examination area, and the output value indicating a pixel value at the coordinates used as the input value, and wherein the output value of the approximation function is defined as the approximate value for the pixel value of the pixel such that the approximate surface is obtained by the approximation function.

21. An image processing apparatus, comprising:

an approximate value calculating unit that calculates approximate values for respective pixel values of pixels of an examination area so that the approximate values are continuous within the examination area, based on the pixel values of the pixels of the examination area in an image;

a validity evaluating unit that evaluates whether the approximate values are valid as the pixel values of the examination area;

an area dividing unit that divides an examination area with the approximate values determined to be invalid by the validity evaluating unit into a plurality of examination areas;

an examination area re-setting unit that sets each area obtained by dividing the examination area by the area dividing unit as a new examination area and controls a repetition of processing; and an abnormal portion detecting unit that detects an abnormal portion based on the pixel values of the pixels in the image and the approximate values determined to be valid by the validity evaluating unit;

wherein the validity evaluating unit includes an evaluation value calculating unit that calculates an evaluation value representing an approximation degree of at least one approximate value relative to at least one respective pixel value of the pixels of the examination area and evaluates whether the at least one approximate value is valid based on the evaluation value;

wherein the evaluation value calculating unit calculates the evaluation value based on a difference between the at least one approximate value and the at least one respective pixel value of the pixels of the examination area;

wherein the approximate value calculating unit calculates an approximate surface for the pixel value of each pixel of the examination area and sets a value on the approximate surface for each pixel of the examination area as the approximate value;

wherein the approximate value calculating unit includes an approximation function calculating unit that calculates an approximation function of an input value for an output value, the input value indicating coordinates of a pixel in an examination area, and the output value indicating a pixel value at the coordinates used as the input value, and wherein the output value of the approximation function is defined as the approximate value for the pixel value of the pixel such that the approximate surface is obtained by the approximation function.

22. The image processing apparatus according to claim 1, wherein the approximation degree indicates a degree of appropriateness of at least one approximate value relative to an overall change of pixel values of the pixels of the examination area.

* * * * *